United States Patent

[11] 3,577,623

[72] Inventors Yosio Ono;
 Hirosi Nakamura; Takasi Inove; Yosio Horie; Junitiro Matui; Fumito Uono, Iwata, Shizuoka, Japan
[21] Appl. No. 795,162
[22] Filed Jan. 30, 1969
[45] Patented May 4, 1971
[73] Assignee Toyo Bearing Manufacturing Company Limited
 Osaki-shi, Japan
[32] Priority Feb. 3, 1968, Feb. 24, 1968
[33] Japan
[31] 43/6853 and 43/13988

[54] APPARATUS AND METHOD FOR AUTOMATICALLY ASSEMBLING ANTIFRICTION BEARINGS
 11 Claims, 34 Drawing Figs.
[52] U.S. Cl.......................................... 29/201, 29/407
[51] Int. Cl....................................... B23p 19/04, B23g 17/00
[50] Field of Search............................. 29/201, 208, 148.4 (A), 211, 407

[56] References Cited
UNITED STATES PATENTS
3,191,259  6/1965  Dalton.......................... 29/201

Primary Examiner—Thomas H. Eager
Attorney—Hall & Houghton

ABSTRACT: An apparatus for automatically assembling antifriction bearings comprising an electric measuring mechanism for measuring the outer diameter of the groove in an inner ring and deriving an electric signal corresponding to the measured size, an electric measuring mechanism for measuring the inner diameter of the groove in an outer ring and deriving an electric signal corresponding to the measured size, an arithmetic unit for comparing the two measured values derived from said measuring mechanisms and deriving a single electric signal corresponding to the difference between the electric signals, a mechanism for selecting rolling elements to be combined with the pair of inner and outer rings by means of said differential electric signal and counting and storing such rolling elements in order of measurements of successive pairs of inner and outer rings, a mechanism for pairing the measured inner and outer rings, and a mechanism for feeding the selected and counted rolling elements into the eccentric clearance between the thus paired inner and outer rings and incorporating a retainer therein, whereby antifriction bearings are automatically assembled by a series of operations of said mechanisms.

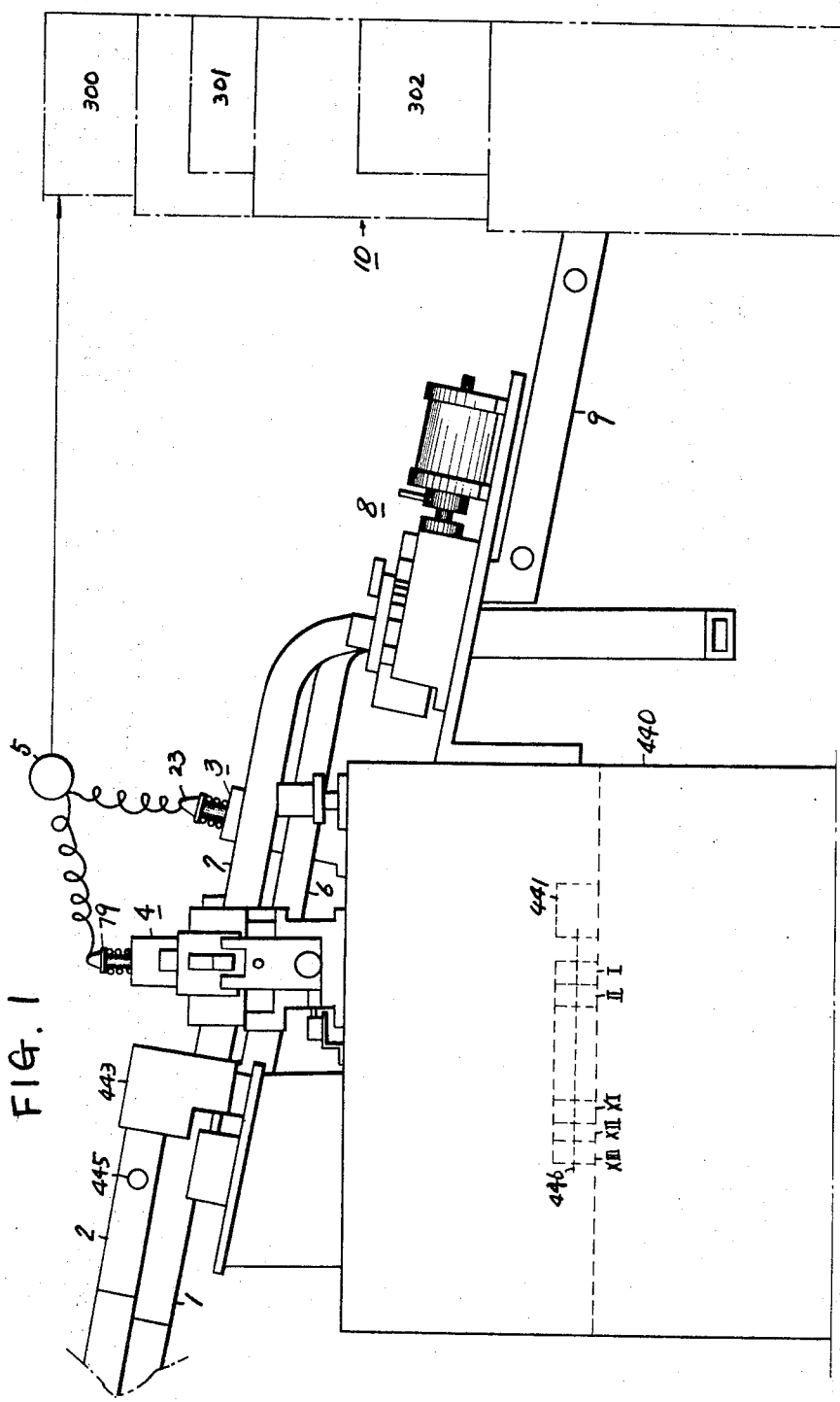

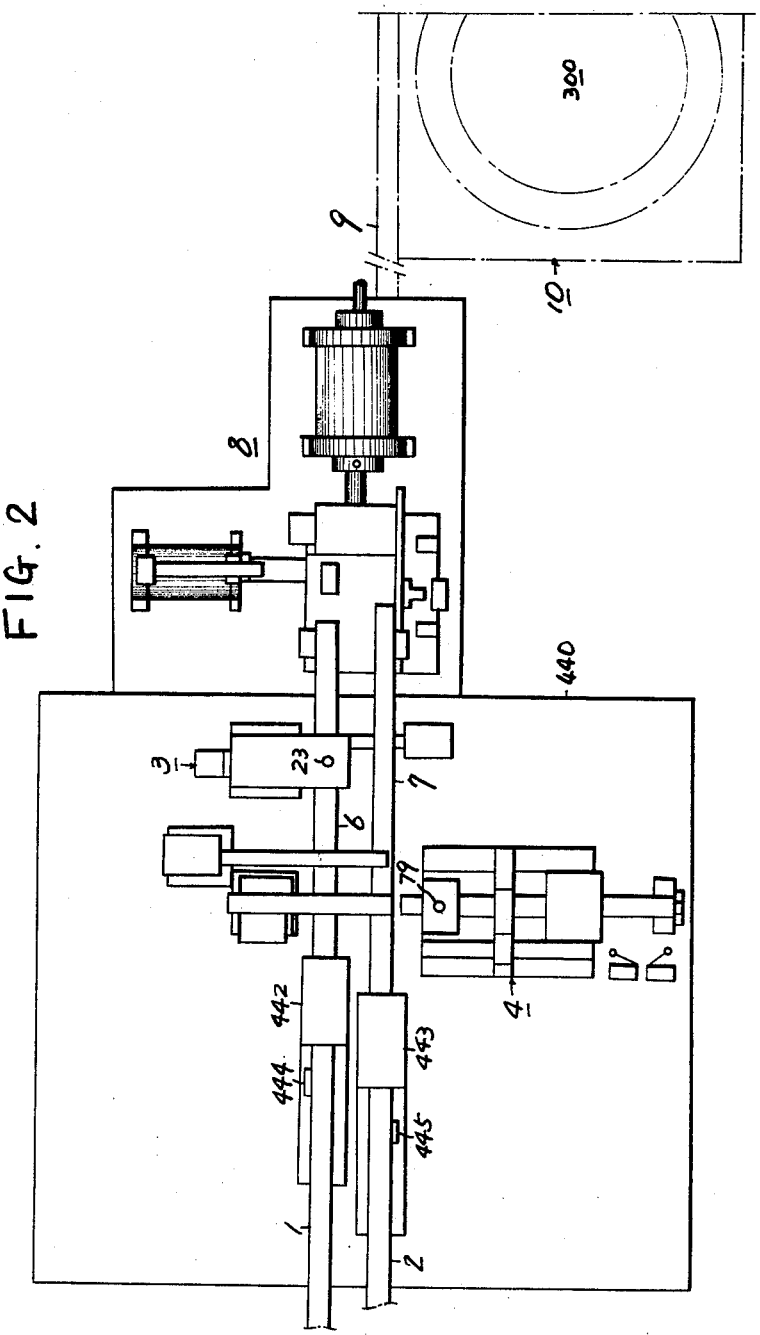

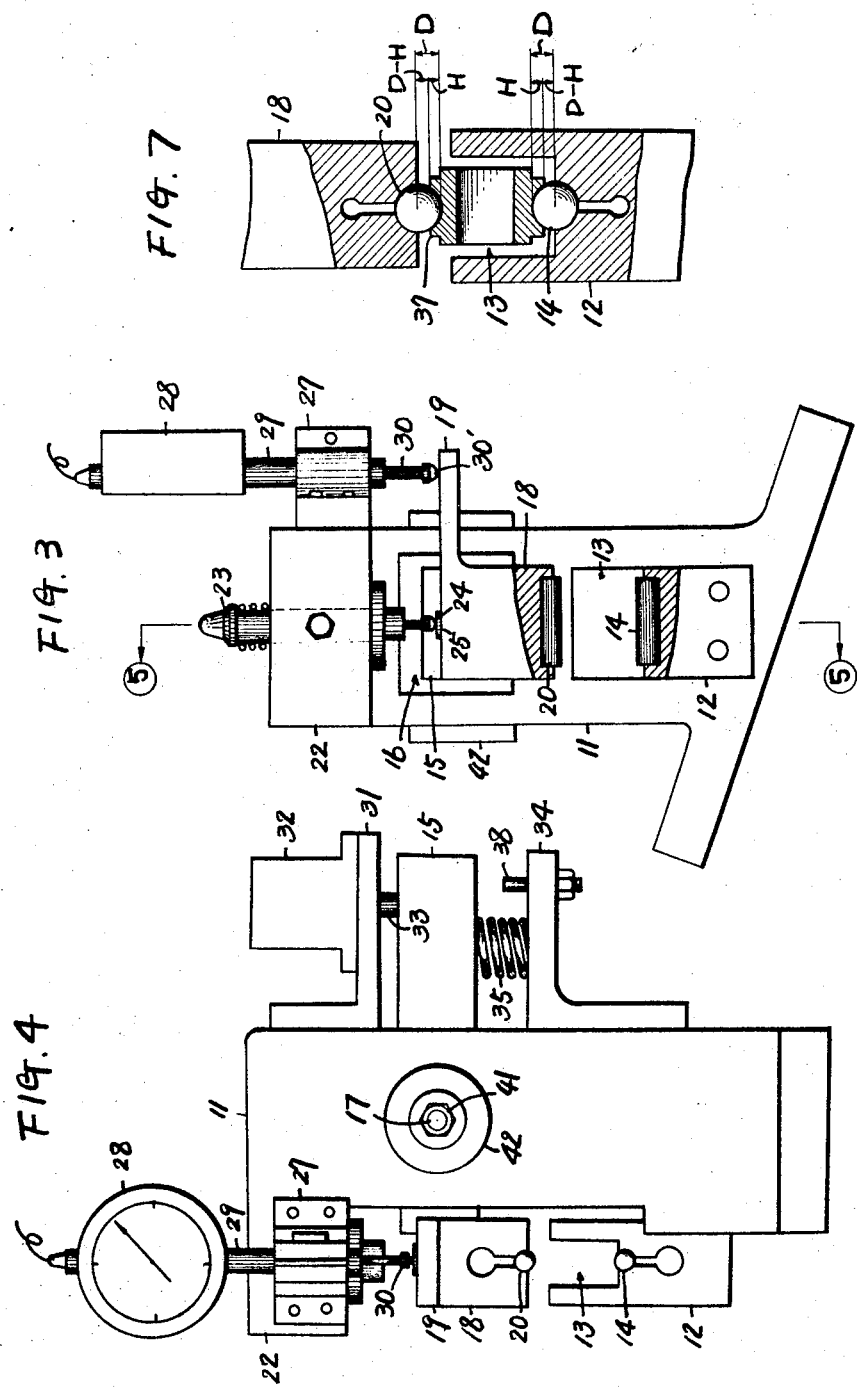

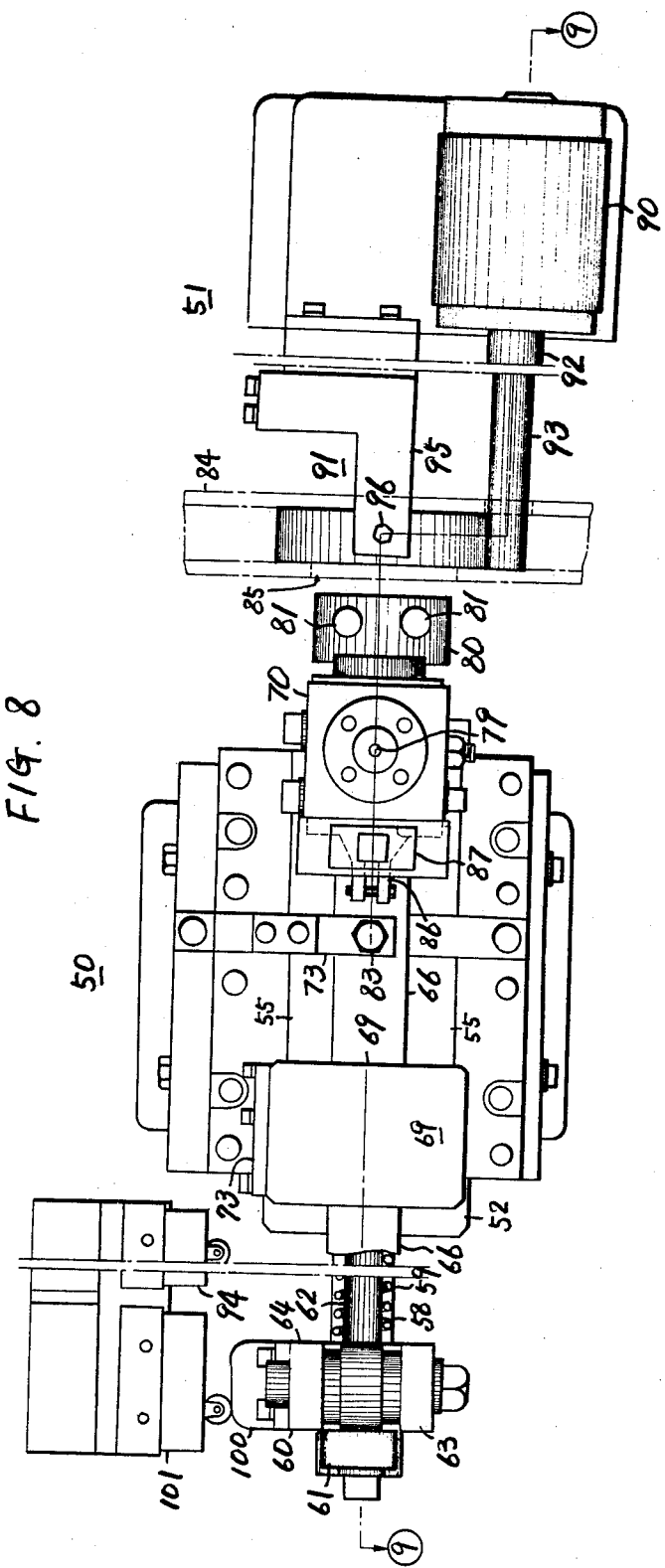

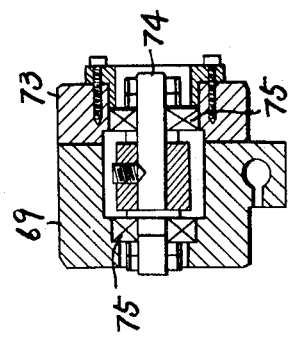
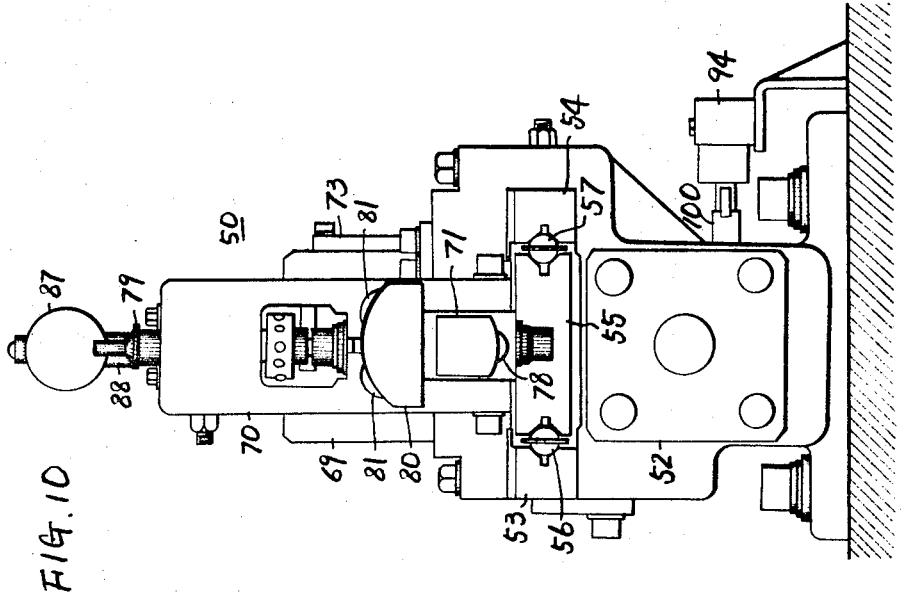

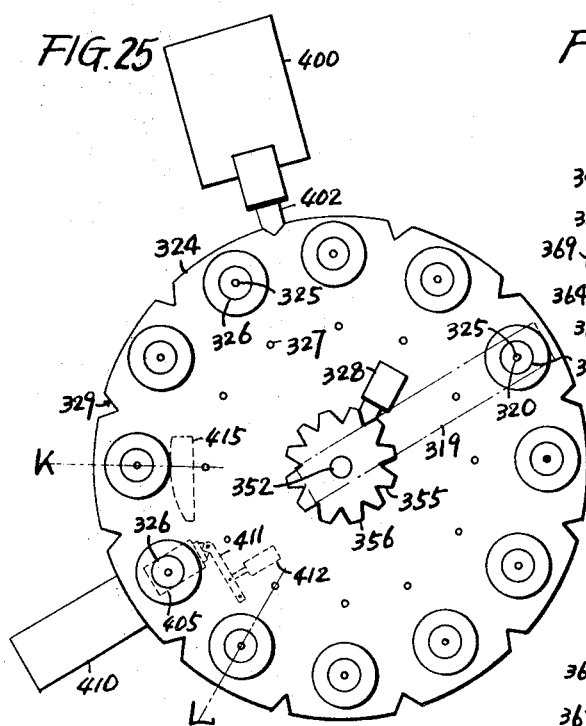
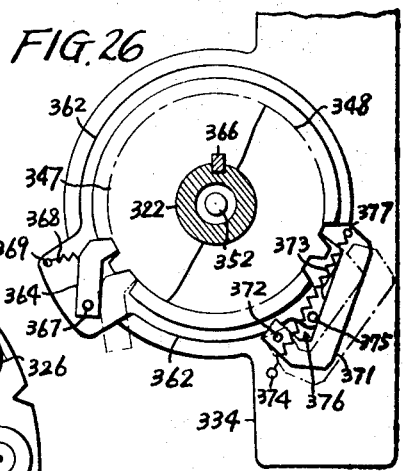
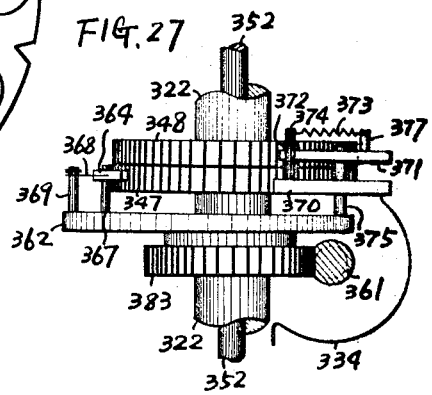
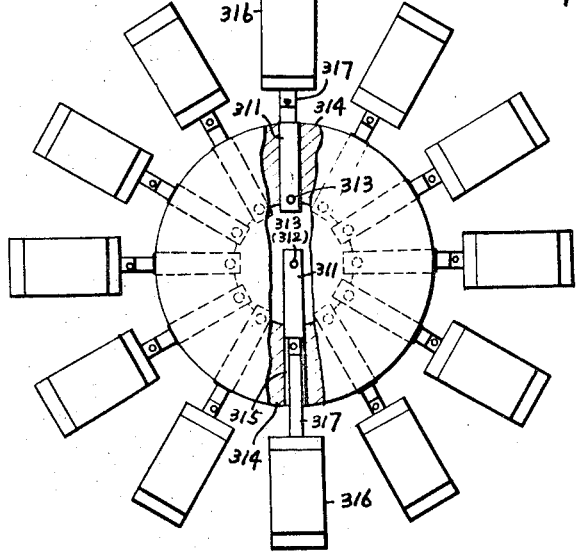
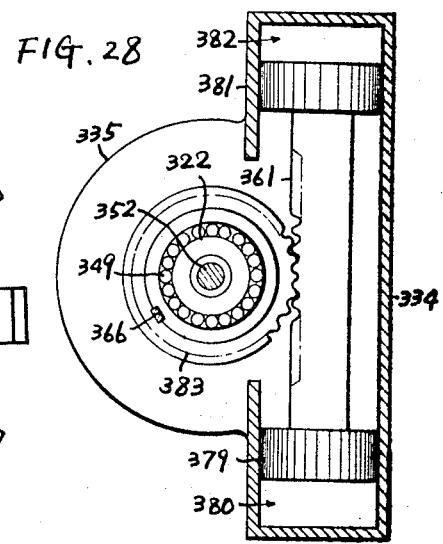

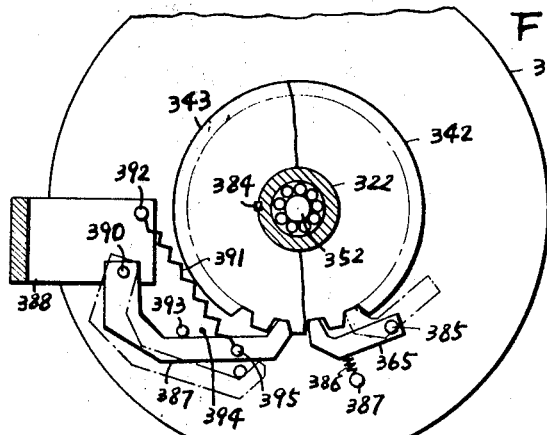
FIG. 29
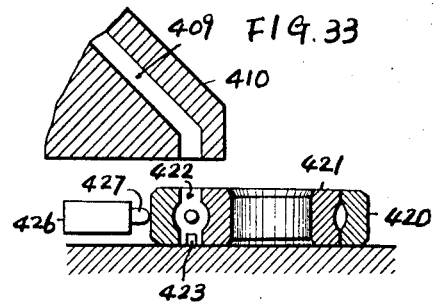
FIG. 33
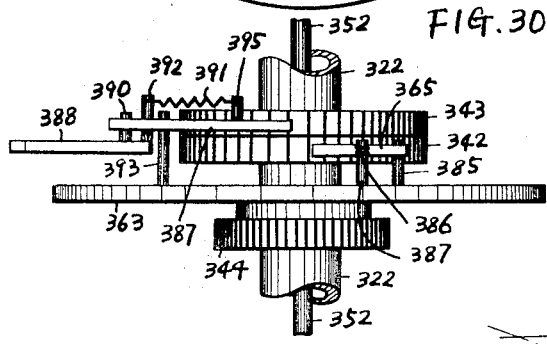
FIG. 30
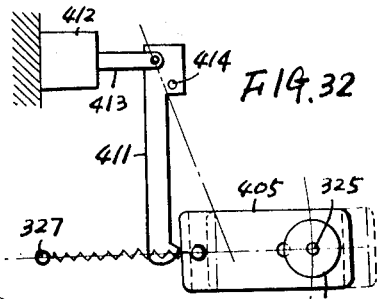
FIG. 32
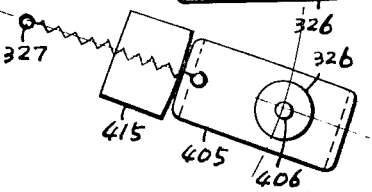
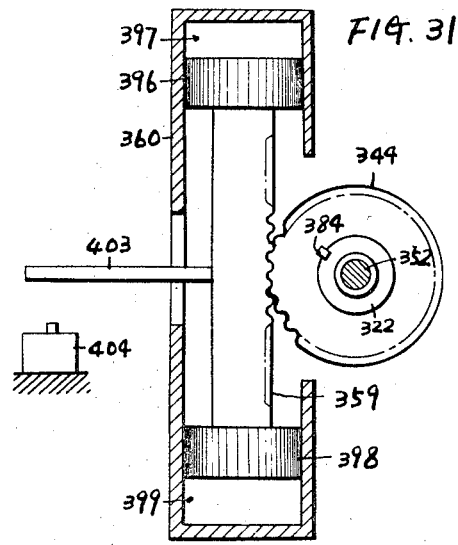
FIG. 31
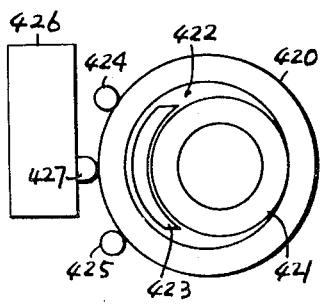
FIG. 34

3,577,623

1

APPARATUS AND METHOD FOR AUTOMATICALLY ASSEMBLING ANTIFRICTION BEARINGS

CROSS-REFERENCES TO RELATED APPLICATIONS

Japanese Pat. application No. 43-6853 dated Feb. 3, 1968. Japanese Utility Model application No. 43-13988 dated Feb. 24, 1968.

BACKGROUND OF THE INVENTION

This invention relates to a method of automatically assembling antifriction bearings.

In the known apparatus for automatically assembling antifriction bearings, the sizes of the mutually cooperative groove diameters of a pair of inner and outer rings to be assembled together are simultaneously computed by a set of mechanical measuring mechanisms and expressed in terms of a single electric signal, which is then used as a selection indication signal for rolling elements thereby selecting desired rolling elements, the latter being then discharged onto a receiver dish. Such simultaneous mechanical measurement of a pair of inner and outer rings to be assembled together, however, has serious disadvantages. Thus, the measured pair of inner and outer rings have to be paired at once. Therefore, it is only after the paired inner and outer rings have been brought to a regular position and a desired clearance is formed between the paired inner and outer rings that the rolling elements on the receiver dish are fed into said clearance. Essentially, inner and outer rings to be paired must of necessity be measured simultaneously, and before the rolling elements on the receiver dish are fed into the clearance the next measurement of inner and outer rings is not allowed, so that much loss of time is caused. This means that the next measurement is not allowed during the time between the beginning and the completion of assembly, thus decreasing the efficiency of assembling work. As a result, the articles are not allowed to stay or stagnate in the intermediate assembling steps, so that a continuous timed operation connected with the individual steps becomes necessary.

If, therefore, an article stagnates during the assembling work, it is necessary to stop the entire machine and remove the stagnant article.

The present invention has been developed in view of the aforesaid disadvantages of the known apparatus of automatically assembling antifriction bearings.

SUMMARY OF THE INVENTION

According to the present invention, the sizes of the mutually cooperative groove diameters of a pair of inner and outer rings to be assembled together are separately measured by independent measuring mechanisms and expressed in terms of different electric signals, and a single electric corresponding to the difference between the electric signals is derived by a separately and independently provided arithmetic unit, said single signal being used as a selection indication signal for rolling elements thereby selecting desired rolling elements. The selected rolling elements are instantly allowed to stay in a temporary storing region successively in order of measurement. Further, the measured inner and outer rings are also allowed to stay in separate temporary storing regions successively in order of measurements. The corresponding inner and outer ring in the separate temporary storing regions are paired or the measured inner and outer rings are instantly paired and such paired rings are allowed to stay in the temporary storing region successively in order of measurement or the measured inner and outer rings are allowed to stay in the separate temporary storing regions successively in order of measurement and the corresponding inner and outer rings in the separate temporary storing regions are paired together and the thus paired rings are allowed to stay in the temporary storing region successively in order of measurement. When the paired inner and outer rings are brought to a regular position, the corresponding rolling elements in the temporary storing region are fed into the eccentric clearance between the inner and outer rings. Therefore, the use of a suitable memory means will make it possible to measure inner and outer rings at different times. Thus, since the measured inner and outer rings can be reserved separately in the temporary storing regions while memorizing them by the memory means, even if either of the inner or outer rings stagnate, it is possible to continue the measurement of the inner or outer rings which do not stagnate. Further, because of the provision of the temporary storing region for paired articles in accordance with the order of measurement, the assembling of paired articles with rolling elements can be continued until the paired articles in the temporary storing region are used up, even if the measurements of both inner and outer rings are temporarily interrupted. In short, since respective temporary storing regions for inner rings, outer rings and rolling elements in accordance with the order of measurement are provided, individual measurements and assembling operations can be effected in an overlapping manner.

BRIEF DESCRIPTION OF THE DRAWINGS

FIG. 1 is a front view of the entire apparatus;
FIG. 2 is a plan view thereof;
FIGS. 3 to 7 are views illustrating an inner-ring groove diameter-measuring mechanism, FIG. 3 being a front view, FIG. 4 being a right-hand elevation, FIG. 5 being a section on line 5-5 of FIG. 3, FIG. 6 being a section on line 6-6 of FIG. 5, FIG. 7 being an enlarged view illustrating how to measure the outer diameter of the inner groove in an inner ring;
FIGS. 8 to 11 are views illustrating an outer-ring groove diameter-measuring mechanism, FIG. 8 being a plan view, FIG. 9 being a section on line 9-9 of FIG. 8, FIG. 10 being a perspective view on line 10-10 of FIG. 9, FIG. 11 being a section on line 11-11 of FIG. 9;
FIGS. 23 to 32 illustrate means for arranging rolling elements of different sizes according to the instructions and discharging such elements into the predetermined clearance between paired inner and outer rings, FIG. 23 being a front view in longitudinal section, FIG. 24 being a plan view on line 24-24 of FIG. 23, FIG. 25 being a plan view on line 25-25 of FIG. 23, FIG. 26 being a plan view of a first ratchet part, FIG. 27 being a side elevation thereof, FIG. 28 being a plan view of a rack-pinion part, FIG. 29 being a plan view of a second ratchet part, FIG. 30 being a side elevation thereof, FIG. 31 being a plan view of the rack-pinion type thereof,
FIG. 32 illustrates a mechanism for discharging rolling elements contained in a storage sleeve;
FIGS. 33 and 34 illustrate a mechanism for assembling rolling elements in the clearance between paired inner and outer rings.

DESCRIPTION OF THE PREFERRED EMBODIMENTS

Figure 5:
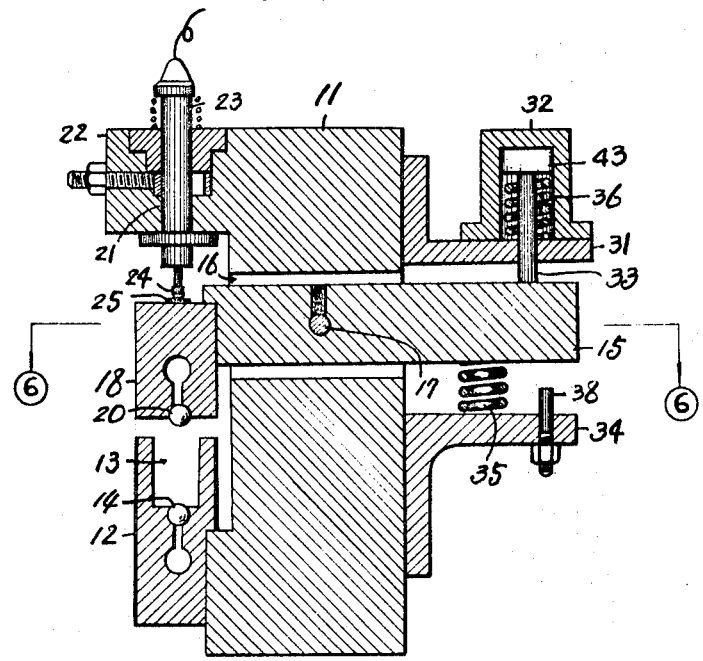

FIGS. 1 and 2 illustrate the entire apparatus according to the invention. Inner and outer rings roll under their own weight in their respective chutes 1 and 2 to reach an inner-ring groove diameter-measuring mechanism 3 and an outer-ring groove diameter-measuring mechanism 4, respectively, the respective measured values being transmitted to a single arithmetic unit 5.

The thus measured inner and outer rings roll under their own weight in chutes 6 and 7 to reach an inner and outer ring pairing mechanism 8, whence the paired rings are delivered to a storage region 9, which is provided in a mechanism 10.

On the other hand, when a pair of rings to be assembled together have been measured as described above, the resulting electric signals are evaluated by said arithmetic unit 5 which, in turn, produces an electric signal corresponding to the difference between said input electric signals, said output signal serving to select rolling elements to be assembled with said pair of rings, the thus selected groups of rolling elements being delivered to a storage region.

The ring pairs in the storage region successively reach a rolling element supply position, where such ring pair is given a predetermined eccentric clearance defined between the rings, whereupon the corresponding group of rolling elements in the storage region are discharged to be fed into said eccentric clearance.

Thereafter, any suitable known mechanisms may be employed to complete bearings in a continuous manner.

FIGS. 1—7 illustrate the inner-ring groove diameter-measuring mechanism 3, comprising a main body 11 disposed adjacent the lateral side of the chute 1 and a fixed measuring member 12 having a recess 13 in the upper surface thereof and secured to said main body 11, said chute 1 being connected to said recess. A holder member 14 adapted to be engaged in the inner-ring groove is secured to the bottom of the recess 13 in such a manner that part of the outer peripheral surface thereof projects above the bottom.

A lever 15 is inserted in an opening 16 in the main body 11 and pivotally mounted by a shaft 17. A movable measuring member 18 cooperating with the fixed measuring member 12 is carried on the front end of said lever.

The movable measuring member 18 has an arm 19 projecting from one side thereof. A holder member 20 adapted to be engaged in inner-ring groove is secured to the lower surface of the movable measuring member 18 in such a manner that part of the outer peripheral surface thereof projects below the lower surface, said holder member being vertically aligned with the holder member 14.

Figure 12:
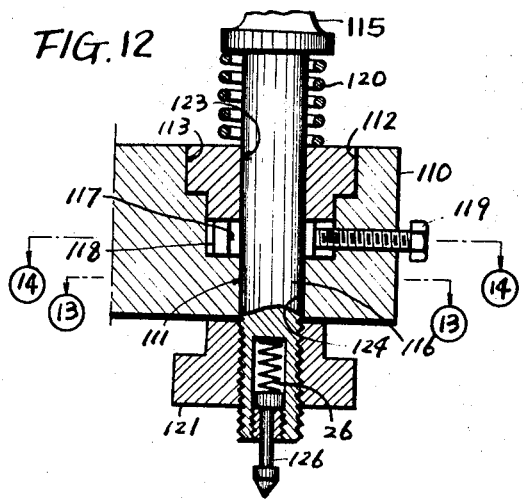
FIGS. 12 to 14 are views illustrating a clamping mechanism for detectors, FIG. 12 being front view, FIG. 13 being a section on line 13-13 of FIG. 12, FIG. 14 being an enlarged section on line 14-14 of FIG. 12.

The main body 11 has an upper projecting portion 22 formed with a vertical opening 21 (FIG. 5) in which is inserted a detector 23 carrying a front end member 24 constantly pressed against the upper surface 25 of the movable measuring member 18 by means of a spring 26 shown in FIG. 12.

A bracket 27 provided on one side of the upper projecting portion 22 of the main body 11 and above the arm 19 supports a stem 29 for a two-point pulse contact-equipped dial gauge 28. The front end of the stem 29 carries a spindle 30 adapted to be vertically shiftable relative to the stem, the front end 30' of the stem being maintained in contact with the upper surface of the arm 19.

A cylinder 32 secured to an L-shaped support 31 has a piston rod 33 which is in contact with the rear upper portion of the lever 15. A spring 35 is interposed between the lower rear portion of the lever 15 and an L-shaped support 34.

As shown in FIG. 5, the piston rod 33 is always urged downwardly against the force of a spring 36 by an air pressure acting on top of the piston 43, so that a clearance large enough to receive an inner ring therein is formed between the holder member 14 and 20 of the fixed and movable measuring members 12 and 14, respectively.

In this condition an inner ring is fed into the recess 13 in the fixed measuring member 12, and upon engagement between the holder member 14 and the inner-ring groove, the air confined between the cylinder 32 and the upper surface of the piston 43 is discharged to allow the spring 36 to raise the piston 43 and hence the piston rod 33. Therefore, the lever 15 is turned counterclockwise around the axis of the pin 17 by the spring 35, so that the movable measuring member 18 on the front end thereof is lowered.

The lowering of the movable measuring member 18 causes the holder member 20 to be engaged in the inner-ring groove.

In this connection, it is to be noted that as shown in FIG. 7 the thickness $H$ of the flange 37 of the inner ring is less than the projecting portion $D$ of the holder member 14, so that there exists a clearance with a size $D-H$ between the recess bottom and the flange 37, thus precluding any possibility of the inner ring getting into contact with the bottom surface of the recess.

Thus, it is seen that when the movable measuring member 18 is lowered to cause the holder member 20 to enter the inner-ring groove, the inner ring is held between the holder members 14 and 20 without the flange 37 getting into contact with the lower surface of the movable measuring member 18. The detector 23 in contact with the upper surface 25 of the movable measuring member 18 then detects the displacement of the upper surface 25 of the movable member 18 with the inner ring held between the holder members 14 and 20, whereby the displacement is derived in terms of an electric signal by the detector 23.

Simultaneously with this measurement of the groove diameter of the inner ring by the detector 23, the dial gauge 28 also measures the diameter. The dial gauge, however, only determines whether the groove diameter is a minus or plus value with respect to a predetermined range of value or is within such range, as will be further described hereinafter.

Upon completion of the measurement of the groove diameter of the inner ring in the manner described above, air is fed to the upper surface of the piston 43 of the cylinder 32, causing the piston rod 33 to lower the lever 15 against the force of the spring 35 until the lower surface of the lever 15 is brought into contact with a stopper 38. As a result, the front end of the lever 15 is turned upwardly around the axis of the shaft 17 to release the holder member 20 of the movable measuring member 18 from its contact with the inner ring, thereby being ready for the measurement of the next inner ring.

Figure 6:
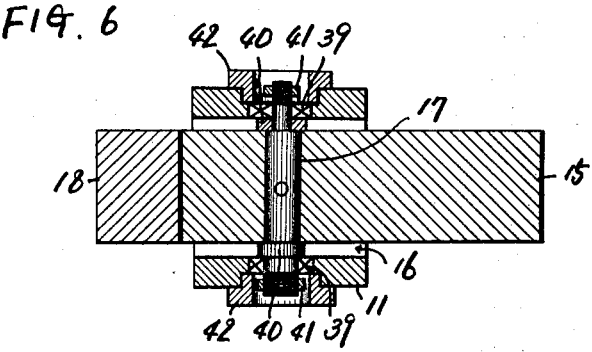

In addition, in FIG. 6, the numeral 39 denotes a bearing for the shaft 17; 40, a washer; 41, a clasp; and 42, a keep member for fixing a bearing 39 in position.

With the arrangement as described above, the objects for measurement are held in position only by the two holders 14, 20 of the measuring members 12, 18, and are measured by the detector 23 while they are in a state thus held, and accordingly, the real dimension of diameter of the receiving groove of the inner ring may be measured quite accurately.

Also, because the measuring members 12, 18, the lever 15 and the detector 23 are fitted on the same body 11, and because the detector 23 is positioned on the axis of the measuring position, the effect of temperature changes may be limited to its minimum.

Moreover, since the bearing is inserted and held in the swinging shaft of lever 15 the lever is prevented from sidewise swings and is enabled to perform repeated measurements in a state of stability, and, thus, as a measuring device, it is highly accurate and usable for a long period of time.

In addition, differences in measurement due to temperature changes could be small, and, at the same time, dimensional divergences in each measurement could also be minor, coupled with the stability of measurement. All these combined make it possible to mitigate the number of times of checking of the standard points due to the passing of time. Consequently, the machine will be required to be stopped less frequently, and this naturally entails an improved work efficiency.

Referring to FIGS. 8—11, the outer-ring groove-measuring mechanism 4 comprises a measuring unit 50 and a positioning unit 51 disposed at both sides of the chute 2.

The arrangement of the measuring unit 50 is as follows.

As shown in FIG. 10, projections 53 and 54 are secured to the upper portion of a main cylinder body 52 on both sides thereof and a shiftable plate 55 is provided between said projections. Rolling bodies 56 and 57 are interposed between the shiftable plate 55 and the projections 53, 54 so that the plate 55 is shiftable on the main cylinder body 52.

Figure 9:
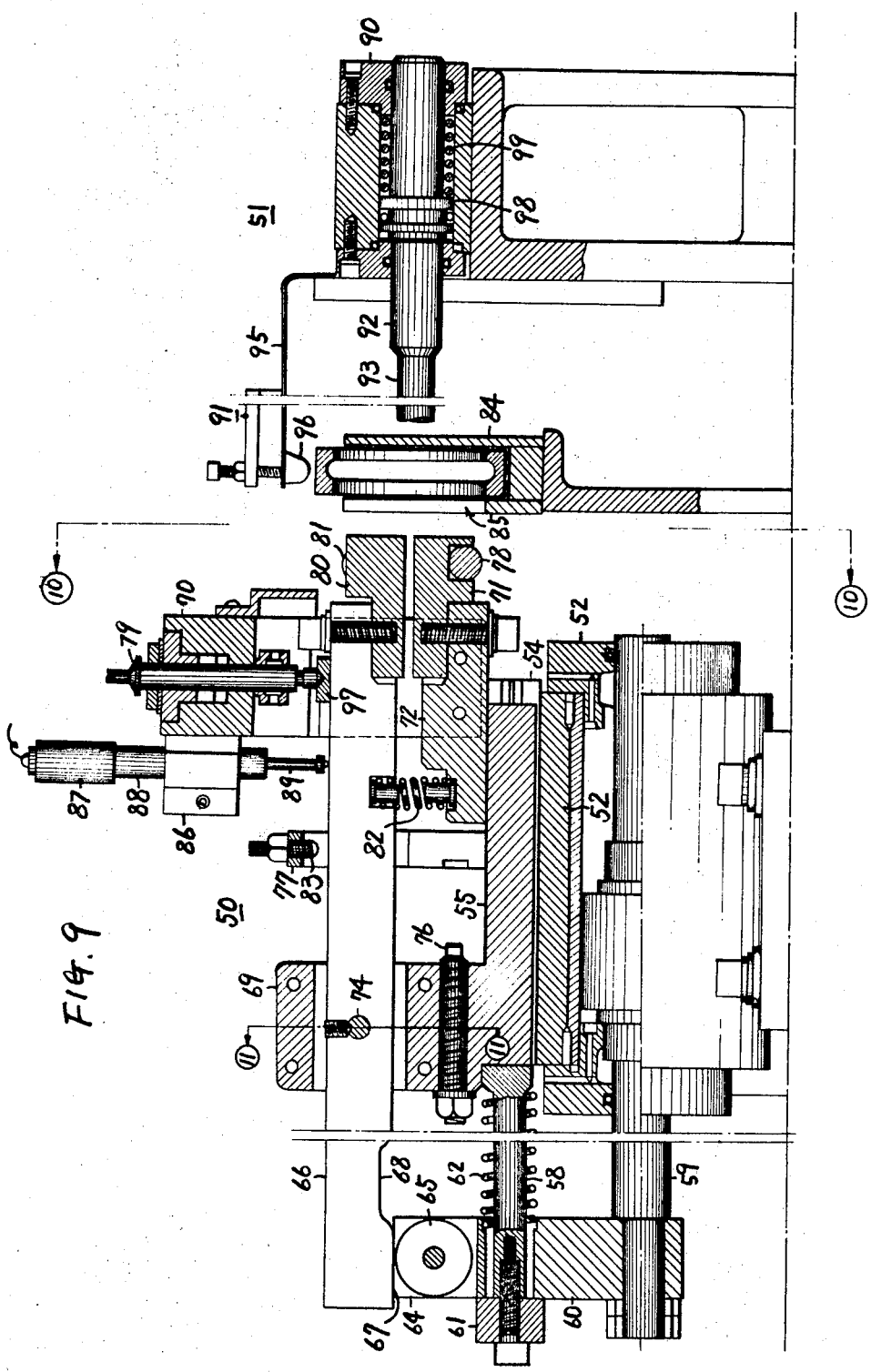

In FIG. 9, the numeral 58 denotes a guide rod having one end secured to the end surface of the shiftable plate 55 and the other end inserted in a fixing plate 60, with a clasp 61 secured thereto by screw means. The numeral 62 denotes a spring inserted between the shiftable plate and the fixing plate.

A rolling body 65 is provided between arms 63 and 64 on the fixing plate 60 and adapted to be in contact with the linear portion 67 or recess 68 in the lower surface of a lever 66 so as to urge or release said lever 66.

A support 69, a gate-shaped member 70 and an attaching plate 72 for a fixed measuring member 71 are secured to the shiftable plate 55.

As shown in FIG. 11, the support 69 has a recess open to one side, and fixed to the lateral open surface thereof is a cover plate 73 thereby defining a hollow space in the support 69 for insertion of the lever 66 therethrough. Within this hollow space, the lever 66 is supported on a support shaft 74 by means of bearings 75.

A stopper 76 is provided in the lower portion of the support 69 and is opposed to a stop plate 77 which is fixed in position straddling the shiftable plate 55 on the main cylinder body 52, so that when the shiftable plate 55 is advanced, the front end of the stopper 76 will hit against the stop plate 77 thereby stopping the shiftable plate 55.

The numeral 78 denotes a measurement ball projecting above the fixed measuring member 71 and adapted to be engaged in the ball-running groove in the outer ring.

The gate-shaped member 70 straddles the attaching plate 72 and is fixed to the shiftable plate 55. The gate-shaped member 70 has a detector 79 mounted thereon and shiftably guides the lever 66 along the inner surface thereof.

A movable measuring member 80 is provided on the front lower surface of the lever 66 and two balls 81 adapted to be engaged in the ball-running groove in the outer ring are provided on the front upper surface of said movable measuring member 80 so as to project therefrom.

A spring 82 is interposed as precompressed between the lever 66 and the shiftable plate 59, so that the movable measuring member 80 is constantly urged upwardly.

A stop 83 provided on the stop plate 77 serves to define an upper limit for the turning movement of the lever 66.

The numeral 86 denotes a U-shaped chute connected to the chute 2 and having openings 85 bored in the lateral wall thereof.

A bracket 86 provided on one side of the gate-shaped member 70 and above the lever 66 fixedly supports the stem 88 of a two-point pulse contact-equipped dial gauge 87. The stem 88 carries a spindle 89 projecting from the lower end thereof and adapted to be vertically shiftable relative to the stem. The spindle 89 is resiliently urged at its front end against the upper surface of the lever 66.

The arrangement of the positioning unit 51 will now be described.

The positioning unit 51 comprises a stop cylinder 90 and a vibrating means 91 for imparting vibrations to outer rings in order to improve the contact between the measuring balls and the ball-running groove in the outer ring prior to the beginning of measurement. The positioning unit is disposed at the other side of the U-shaped chute 84 and opposed to the measuring unit 50.

A stop rod 93 is connected to the piston rod 92 of the stop cylinder 90 and is so positioned as to stop an outer ring so that the axis of the measuring member assembly 71, 80 coincides with axis of said outer ring. The other sidewall of the U-shaped chute is provided with an opening through which a stop rod 93 is advanced. The outer ring rolling on the U-shaped chute will be stopped at a predetermined position by the stop rod 93.

By means of an electric signal issued by an outer-ring-ascertaining switch secured to the U-shaped chute, a magnet valve for actuating a cylinder 52 is caused to operate so that a piston rod 59 and the stop plate 60 are moved to the right as viewed in FIG. 9, whereby those parts which are integral with the shiftable plate 55 through the spring 62, namely the support 69, lever 66, movable measuring member 81, fixed measuring member 71 and gate-shaped member 70 are moved to the right while maintaining their relative position. Thus the movable and fixed measuring members 80 and 71 enter the openings 58 in the U-shaped chute 84 and then the outer ring stopped by the stop rod 93, and when the balls 78 and 81 are positioned approximately at the middle of the width of the ball-running groove in the outer ring, the front end of the stopper 76 carried by the support 69 bears against the stop plate 77, whereupon the forward movement of the shiftable plate 55 is stopped.

In this condition, as the piston rod 59 is further moved to the right, the fixing plate 60 alone is moved while compressing the spring 62 until at last the rolling body 65 becomes engaged in the recess 68, whereupon the lever 66 is turned counterclockwise by the spring 82 around the axis of the shaft 74 while being guided by the inner surface of the gate-shaped member 70, so that the balls 81 enter the outer-ring groove for contact with the ball-running surface and is further raised to raise the outer ring away from the bottom surface of the U-shaped chute 84, and as the balls 81 are still further raised, the ball 78 also enters the ball-running groove in the outer ring and is at last brought into contact with the groove bottom, whereupon the upward movement of the lever 66 is finally prevented as the ball 78 thus interferes with such movement.

The advanced position of the piston rod 59 is detected by a switch 94 secured to the lateral surface of the fixing plate 60, as shown in FIG. 8, so that the vibrating means 91 is actuated to cause the conical projection 96 of a plate spring 95 to beat the outer periphery of the outer ring located in the measuring position to impart weak vibration thereto for a predetermined time.

The purpose of such vibration is to stabilize and perfect the thrusting contact of the balls 78 and 81 with the ball-running groove in the outer ring.

Upon the stoppage of the vibrations, the position of the upper surface 97 of the lever 66 is ascertained by the detector 79 for issuing a corresponding signal.

Simultaneously with the measurement with the detector 79, the spindle 87 of the dial gauge 87 is retracted and the groove diameter is measured also by the dial gauge 87. The measurement with the dial gauge is made in the same way as in the case of the measurement of the groove diameter of the inner ring, the operation thereof being later described in more detail.

The signal issued by the switch 94 actuates a magnet valve for actuating the cylinder 90 to feed air to the front surface of the piston 98 to retract the piston 98 while compressing a spring 99, whereby its contact with the outer periphery of the outer ring which has been raised by the movable measuring member 80 is lost and the obstruction to the U-shaped chute 84 is removed so as to be ready for the discharge of the outer ring as it rolls out of the U-shaped chute.

After measurement, the cylinder-actuating magnet valve is changed over, so that the piston, piston rod 59 and fixing plate 60 are moved to the left as viewed in FIG. 9. Along with this movement, the rolling member 65 is moved out of the recess 68 in the lever 66 to the straight portion of the lower surface of the lever 66, thereby pivoting the lever 66 clockwise around the axis of the shaft 74. This movement of the lever 66 lowers the movable measuring member 80 to separate the ball 78 of the fixed measuring member 71 from the groove in the outer ring, so that the bottom of the outer periphery of the outer ring comes into contact with the bottom of the chute and the balls 81 of the movable measuring member 80 are separated from the groove in the outer ring.

The above-mentioned operations are effected during the movement of the rolling body 65 from the recess 68 in the lever 66 to the lower surface 67.

As the piston rod 59 and the fixing plate 60 are retracted, the rear side of the fixing plate 60 is contacted with the clasp 61, and thereafter the shiftable plate 55, support 69, lever 66, movable measuring member 80, metal fixture 72, fixed measuring member 71 and gate-shaped member 70 are unitarily retracted, with the front ends of the members 71, 78 being withdrawn from the holes 85 in the U-shaped chute 84, and the outer ring is released from the measuring position to roll in the chute.

In addition, the retracted position of the piston rod 59 is ascertained in that an ascertaining arm 100 shown in FIG. 8 comes into contact with a switch 101, which issues a corresponding signal for actuating the changeover valve for the cylinder 90, whereby the air at the front surface of the piston 98 is discharged so that the stop rod 93 projects to the front surface of the U-shaped chute so as to be ready for stopping the next outer ring.

Since, as described above, the positions of the measuring members 71, 80 and the position of the detector 79 are on the same side and mutually adjacent in relation to the rotary shaft 74 of the lever 60, this makes it possible to reduce to the minimum the errors resulting from the prolongation of the lever owing to temperature changes and the errors on account of vibrations consequent upon the interlocking movements.

Since, moreover, a greater part of the weight of the components fitted on the sliding plate 55 is supported by the cylinder body 52, the load applied at the end of the piston lever 59 may be negligible, and, moreover, because the piston lever 29 is slidingly supported through the cover plate of the cylinder 52, the piston and cylinder are enabled to slide smoothly in such a way that the measurement may be performed in a condition of stability.

By a single motion of the cylinder, the advance ascending measurement, descent and retrocession of both terminals are made. On this account, there is no likelihood of erroneous movements being performed and the operation of measurement may thus be carried out in safety and stability. Naturally, neither failures nor troubles are entailed. Moreover, the bearing is fitted on the swinging shaft 74 of the lever 70 so that their processing and fitting work may be carried out simply and accurately. The service life may be prolonged, and, in addition, the accuracy may be maintained for a long duration of time.

In addition, the measuring members 71, 80 are anchored to the lever and fitting board 72 by means of a semicircular R surface, positioning pins and tightening pins. This makes it possible to repair or replace the members simply and easily.

Even if the measurements are performed repeatedly, dimensional divergences could remain extremely small (less than 0.3 $\mu$), and, moreover, high accuracy may be maintained for a long period of time so that the number of times of checking operation of the standard points could be minimized, and the work efficiency greatly improved.

By means of this device, in practice, the dimensional divergence could be reduced within a shorter period of time as compared with that of the conventional model by one-half, while the time interval for checking the basic dimensions due to temperature changes could be more than doubled.

Figure 13:
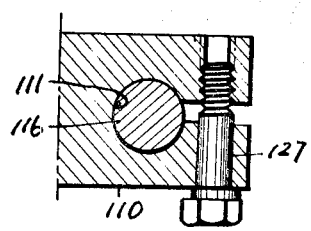
Figure 14:
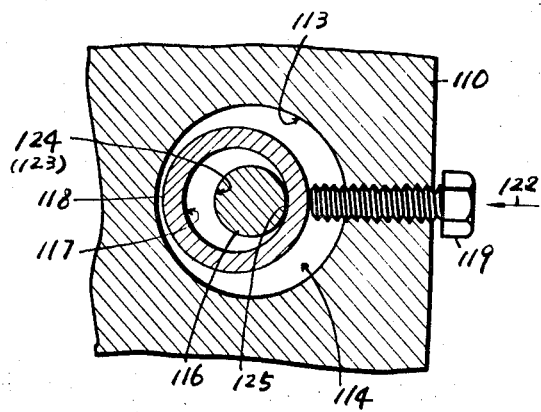

FIGS. 12 to 14 are views explanatory of a clamping mechanism for the detectors 23 and 79 shown in FIGS. 5 and 9, the arrangement of the mechanism being as follows.

Indicated at 110 is a part corresponding to the upper projecting portion 21 in FIG. 3 and to the gate-shaped member 70 in FIG. 9.

The part 110 is bored with a hole 111 for insertion therein of a measuring instrument 115 corresponding to the detectors 23 and 79, the upper portion of said hole being enlarged to form a stepped hole 113 in which a stepped bushing 112 is fitted and firmly held.

In addition, it is so arranged that a space 114 is defined between the lower surface of the stepped bushing 112 and the hole 111.

Loosely fitted in this space is a ring having a hole 117 of larger diameter than the diameter of the cylindrical portion 116 of the measuring instrument, the outer diameter of said ring being smaller than the inner diameter of the space 114. A screw 119 is screwed into the part 110, directed from outside the latter to the center of the space 114.

With the above-mentioned arrangement, the measuring instrument 115 with the stepped bushing 118 and ring 118 fitted thereon is inserted in the hole 111 and a spring 120 is attached to the upper surface of the part 115 and a clamping screw 121 is attached to the lower surface. In this condition if the clamping screw 121 is tightened, the measuring instrument 115 is moved downwardly against the force of the spring 120. Reversely, if the spring 121 is loosened, the measuring instrument is moved upwardly by the action of the spring 120. Thus, the positional setting of the instrument with fine adjustment is made possible.

After the completion of the positional setting of the measuring instrument in the manner described above, the screw 119 is threadwise advanced so that its front end urges the ring 118 in the direction of arrow 122 as shown in FIG. 4. Thus, in FIG. 14, the outer surface of the measuring instrument is urged against the inner walls of the holes 120 and 111 in the stepped bushing 112 and part 110, respectively, and also against the inner wall portion 125 of the ring 118, with the result that the cylindrical portion of the measuring instrument is clamped at the upper and lower regions thereof. That is to say, the measuring instrument is firmly held by the part 110.

When the screw 119 is loosened, the ring is rendered free to move transversely, so that the cylindrical portion of the measuring instrument is now in contact only with the inner walls of the stepped bushing and hole 111.

Therefore, by manipulating the clamping screw 127, the measuring instrument can be freely mounted to and removed from the part 110.

The measuring instrument houses at the lower end thereof a piston rod 126 to be pressed against an associated lever, said piston rod being constantly urged downwardly by a spring 26.

Because of the arrangement described above, the measuring instrument is firmly held by the inner surfaces of the part 111 and ring hole, so that neither damage nor local distortion will be caused to the cylindrical surface of the measuring instrument. Therefore, no variations will occur in the accuracy of the measuring instrument and hence a longer service life thereof is assured.

Further, since, after slight alteration of the position of the front end of the measuring instrument, the screw 119 is threadwise advanced to allow the transverse shifting of the ring for holding it, there will be no variations in the vertical position. Further, positioning with an accuracy of the order of micron unit is easily attained. FUrther, since the hole in the part 110 and the stepped bushing-attaching hole can be machined in the same stage, the accuracy of the angle at which the measuring instrument is fixed is improved.

The inner and outer rings which have been measured with the inner- and outer-ring groove-measuring mechanisms are delivered to the inner- and outer-ring-pairing mechanism 8 shown in FIGS. 15 to 19, where those inner and outer rings which can be paired together are actually done so, the resulting ring pairs being conveyed to the subsequent process. In addition, those inner and outer rings which the measurement has revealed to be incapable of being paired together will be separately discharged.

The arrangement of the mechanism 8 will now be described.

Figure 16:
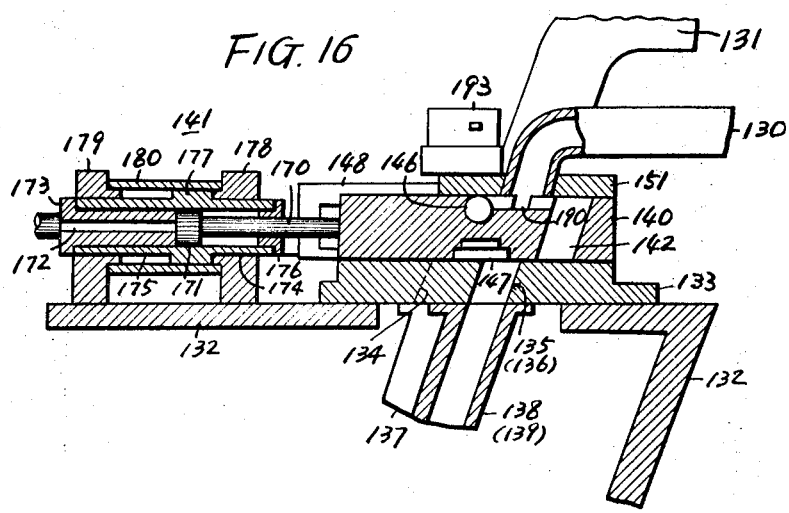

A platform 132 carries a baseplate 133 secured thereto and obliquely bored with a discharge hole 134 for discharging paired rings and with discharge holes 135 and 136 for discharging inner and outer rings, respectively, which are not to be paired together, said three holes respectively having chutes 137, 138 and 139 connected thereto, as shown in FIG. 16.

Figure 15:
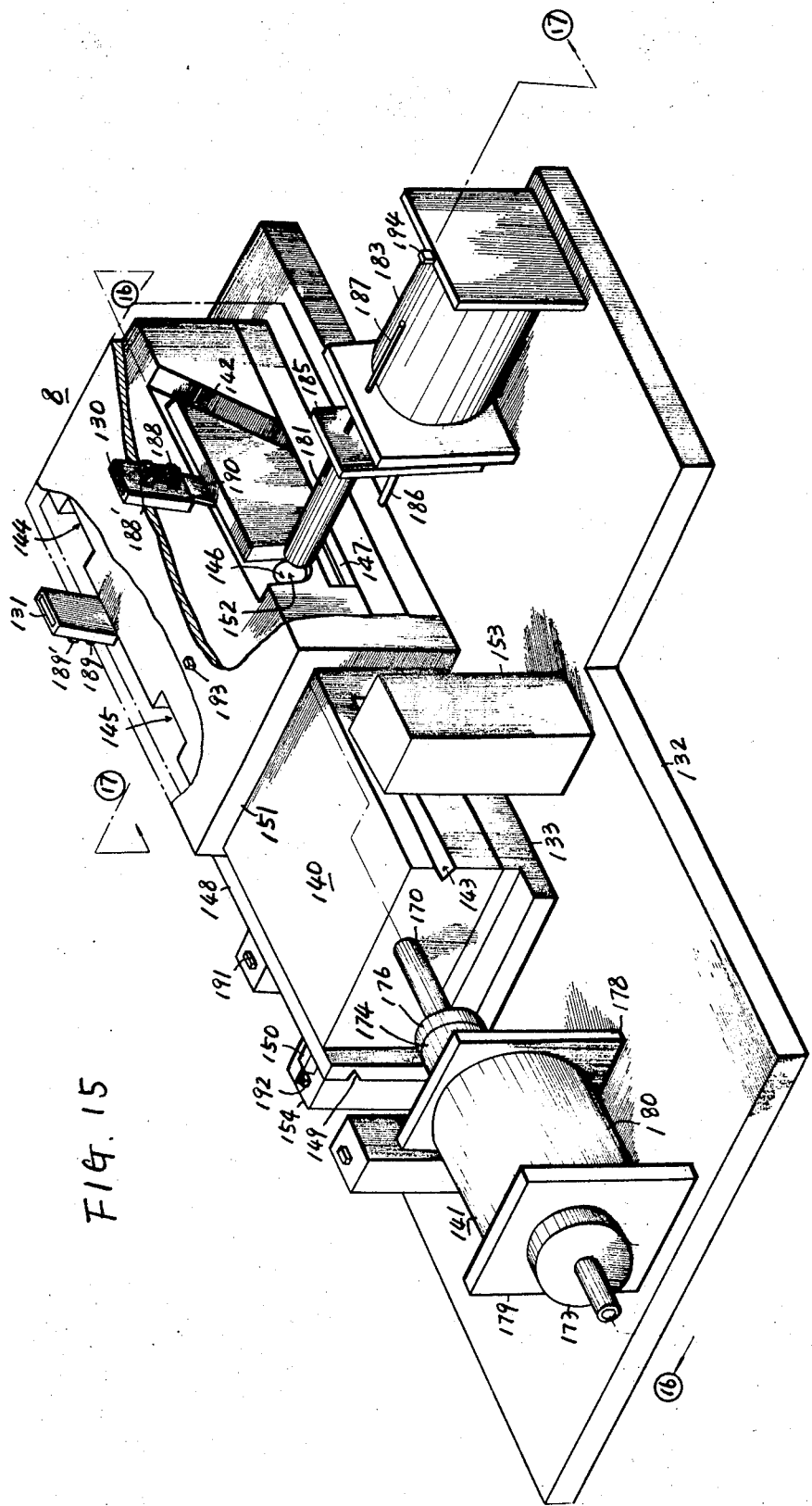
FIGS. 15 to 19 are views illustrating an inner- and outer-ring-pairing mechanism, FIG. 15 being a fragmentary perspective view, FIG. 16 being a section on line 16-16 of FIG. 15, FIG. 17 being a section on line 17-17 of FIG. 15, FIG. 18 being a plan view of a receiver block, FIG. 19 being a perspective view in longitudinal section on line 19-19 of FIG. 18.

A carrier 140 is provided on the baseplate and adapted to be moved back and forth on the baseplate 133 by means of a two-action three-position stop cylinder 141. As shown in FIG. 15, the carrier 140 has on the right-hand lateral surface an inner ring discharge groove 142 which is inclined, and a V-shaped groove 143 parallel to the baseplate and, on the other lateral surface, and outer ring discharge groove 144 corresponding to the inner ring discharge groove, a passage groove 145 through which rings to be paired are passed, and an opening 145 through which inner rings are to be thrusted in, said opening being located in the upper region of the thickness of the carrier and extending parallel to a line which crosses the passage groove at right angles. Further, the carrier contains therein a receiver block 147 for receiving rings to be paired, said receiver block being positioned below said opening. A lateral plate 148 is secured to the left-hand lateral surface of said carrier 140 and provided with a V-shaped groove 149 parallel to the baseplate, and also with a position-ascertaining T-shaped member 150. Thus the lateral plate 148 covers the outer-ring discharge groove 144 and passage groove 145, thereby completing these grooves. An inverted L-shaped plate 151 is secured to the baseplate 133 so as to cover the front half of the upper and right-hand lateral surfaces. The plate 151 thus covers the inner-ring discharge groove 142 and opening 146, there being formed an inner-ring-falling space 152 at the right-hand end of the opening 146. The front ends of chutes 130 and 131 are fitted into the upper surface of the plate 151.

The thus constructed carrier 140 is so mounted as to be easily shiftable on the baseplate by means of rollers retained by supports 153 and 154 and engaging in the U-shaped grooves 143 and 149.

Figure 18:
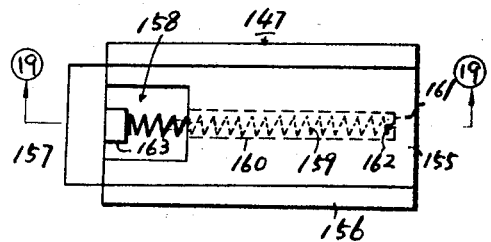

The receiver block 147 contained in the central lower portion of the carrier consists of an upper member 155 and a lower member 156, as shown in FIG. 18, 19. The upper member 155 has a projection 157 at one end thereof, a discharge hole 158 for paired rings inside of said projection, an elongated groove 160 at the central portion thereof for containing therein a spring 159, and a holder pin 162 for said spring secured to the rear end surface of said elongated groove.

The lower member 156 has a projection 163 at the front end thereof. The projection 163 is inserted in the discharge hole 158 in the upper member 155 and the spring 159 is disposed in a space between the projection 163 and the end surface 161 in a prestressed state so that the projections 157 and 163 are pressed against each other. The lower member 156 is fixed so as not to be moved relative to the carrier.

Figure 17:
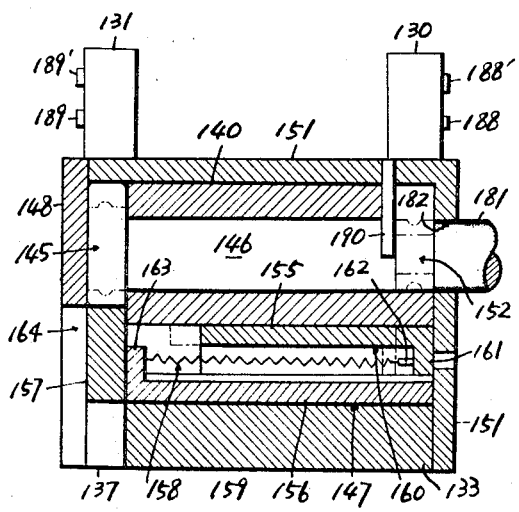

It is so arranged that when the thus constructed receiver block 147 is put in the carrier 140, as shown in FIG. 17, the projection 157 of the upper member 155 extends into the passage groove 145 in the carrier. In addition, the lateral plate 148 secured to the left-hand lateral surface of the carrier is cut away at its portion 164 corresponding to the projection 157 as shown in FIG. 17 so as to allow the upper member to move to the left as viewed in the FIG.

The cylinder 141 for actuating the carrier 140 is arranged as follows.

As shown in FIG. 16, the front end of first piston rod 170 is connected to the rear end of the carrier. The piston 171 of the first piston rod 170 is shiftably received in the cylinder consisting of a plug 173 with an air hole 172, a sleeve constituting second piston rods 174 and 175, and a cover plate 176.

A second piston 177 is constructed integrally with the second piston rods 174 and 175 and located therebetween and is shiftably received in a cylinder 180 firmly held between end plates 178 and 179. The second piston rods 174 and 175 on the opposite ends extend through the end plates 178 and 179, respectively.

A pusher 181 for pushing the inner ring with the space 152 shown in FIGS. 5 and 7 into the bore in the outer ring resting on the projection 157 is provided at a place which will come into axial alignment with the opening 146 in the carrier when the latter is in its advanced terminal end. In addition, at the corresponding place in the plate 151, there is formed a hole 182 through which the pusher passes.

The numeral 183 denotes a pusher driving cylinder, and the piston rod is provided with a plate 185 which is provided with a pin 186 for pushing the outer side surface of the end portion 161 (FIG. 19) of the receiving block 147, and also with a piston rod position-ascertaining rod 187.

The inner and outer rings which have been measured roll in the chute 130, 131 respectively, and then stop on the upper surface of the carrier 140, and when this is ascertained by contactless switches 188 and 189 attached to the chutes, air is fed to to the left-hand side of the first piston 171 so that the first piston rod 170 is advanced, whereby the groove 145 and opening 146 in the carrier are brought into alignment with the outlets of the chutes 130 and 131, respectively. In this position a projection 190 on the chute 190 covers the inlet of the opening 146 to define a space 152 outside the projection 190, into which space the inner ring falls. The outer ring rests on the projection 157 extending into the groove 145 on the other side. The position at which the carrier, when advanced, receives the inner ring is ascertained by the member 150 on the sideplate 148 in cooperation with a microswitch 191 on the top of the support.

Upon completion of the receipt of the inner and outer rings, the magnet valve is changed over, so that the first piston rod 170 is retracted and stops at a position where the opening 146 in the carrier is in alignment with the pusher 181. This position is ascertained by the member 150 as the latter contacts a microswitch 192. The signal from this microswitch actuates the pusher-driving cylinder 183 to advance the pusher 181, pin 186 and position-ascertaining bar 187, whereby the inner ring in the space 152 is pushed through the opening into the bore of the outer ring positioned in the groove 145 and on the projection 157 of the receiver block 147.

Near the end of the forward stroke of the pusher, the pin 186 pushes the upper member 155 against the force of the spring 159 to move the projection 157 away from the groove 145 and bring the discharge hole 158 into alignment with the groove 145. Therefore, the paired rings are transferred to the discharge chute 137 through the discharge hole 158. The advanced position of the pusher is ascertained as the front end of the rod 187 contacts a microswitch 193. The ascertainment signal from this microswitch actuates the cylinder 183 to retract the pusher, pin and rod, THus the front end surface of the pusher leaves the opening and then stops, thus being ready for the falling of the next inner ring.

At this time, the pin 186 is, of course, out of contact with the receiver block, so that the projection 157 of the receiver block again extends into the groove 145 in the carrier under the action of the spring 159.

In addition, the retracted position of the pusher is ascertained as the rod 187 contacts a microswitch 194.

In case those inner and outer rings which should not be paired together enter the chutes 130 and 131, the signals from the contactless microswitches 188 and 189 and the signal from the preceding process (measuring section) indicating that pairing should not be effected, cooperate with each other to actuate the second piston 177 so that the latter, while containing therein the first piston 171 and first piston rod 170, is moved to the left as viewed in the FIGS. until the discharge grooves 142 and 144 in the carrier come into alignment with the chutes 130, 131 and discharge holes 135, 136 (FIG. 16). After discharge, the magnet valve is changed over to return the second piston so that the carrier opening assumes a position opposite to the pusher carrier opening assumes a position opposite to the pusher, thus being ready for the next operation.

In case only one article which is either one of the inner and outer rings comes onto the upper surface of the carrier by accident, one of the ascertaining signals from the contactless microswitches 188 and 189 is used to discharge it in the same manner as that in which those articles which should not be paired are discharged.

Further, in case only one article which is either one of the inner and outer rings, or two same articles arrive at the chute, a two-article ascertaining contactless microswitch 188' or 189' gives the second piston-serving magnet valve a signal indicating that the presence of two articles on the carrier and in the chute is ascertained, so that the articles are discharged in the same manner as that in which those articles which should not be paired are discharged.

As explained in the foregoing, the position of the receiving piled-up articles, the position where they arrive, and the position of discharge of articles which should never be piled up—all these positions may be known separately and individually, and consequently, there is absolutely no possibility whatsoever of any erroneous action being performed in the course of piling-up operations, or of any other objects standing in this way.

Also, when the inner ring is about to enter the cavity 152 of the receiving part, the inlet for the through hole 146 for the inner ring insertion is blocked by a protruding piece 190, and is guided thereby so that it is enabled to drop properly and stably. Consequently, when it is pushed into the through hole for the inner-ring insertion by means of a pusher, no trouble will likely occur.

Besides, since the bottom of the through hole for the inner ring insertion and the receiving surface of the cavity 152 for the drop of the inner ring are made of an integrally structured material, the inner ring, when being pushed in, may neither be caught on the midway nor fall.

Also, the passage for the piled-up articles and that for the articles which should not be piled up are entirely different, and confusion due to an erroneous action may never take place. Even if piled-up articles and those which should not be piled up happen to be mingled and advance through the chute in a quick succession, they may at once be separated by a microswitch for confirmation, being enabled to appropriately act respectively, and, consequently, they may be incorporated in a continuous automatic line for their use.

Moreover, piston No. 1 and piston No. 2 are built in a single cylinder, by which two-action and three-positioning actions are enabled. Thus, an accurate positioning procedure may be assured in spite of their being of small sizes.

Figure 20:
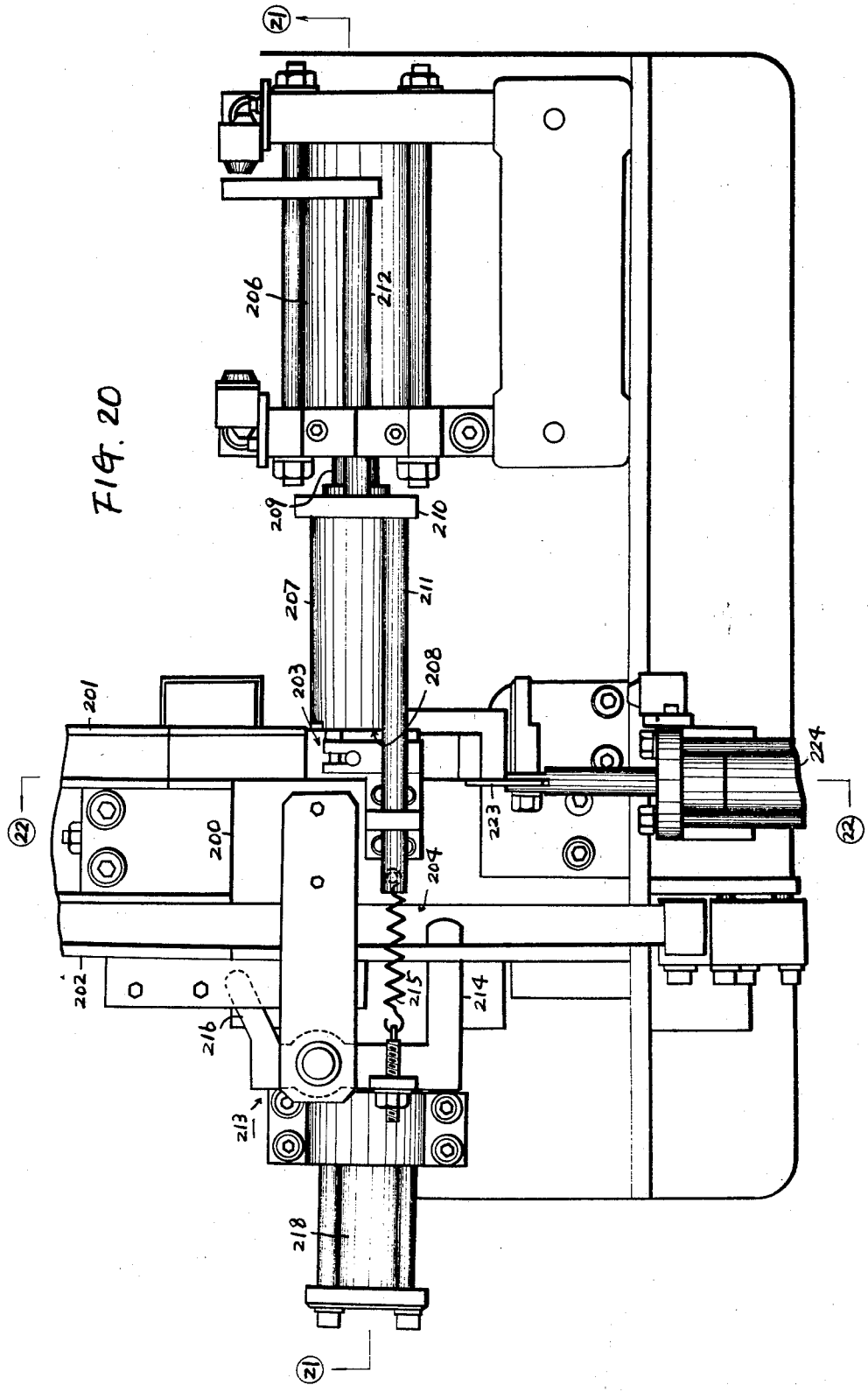
FIGS. 20 to 22 illustrate another embodiment of the inner- and outer-ring-pairing mechanism, FIG. 20 being a plan view, FIG. 21 being a section on line 21-21 of FIG. 20, FIG. 22 being a section on line 22-22 of FIG. 20.
Figure 21:
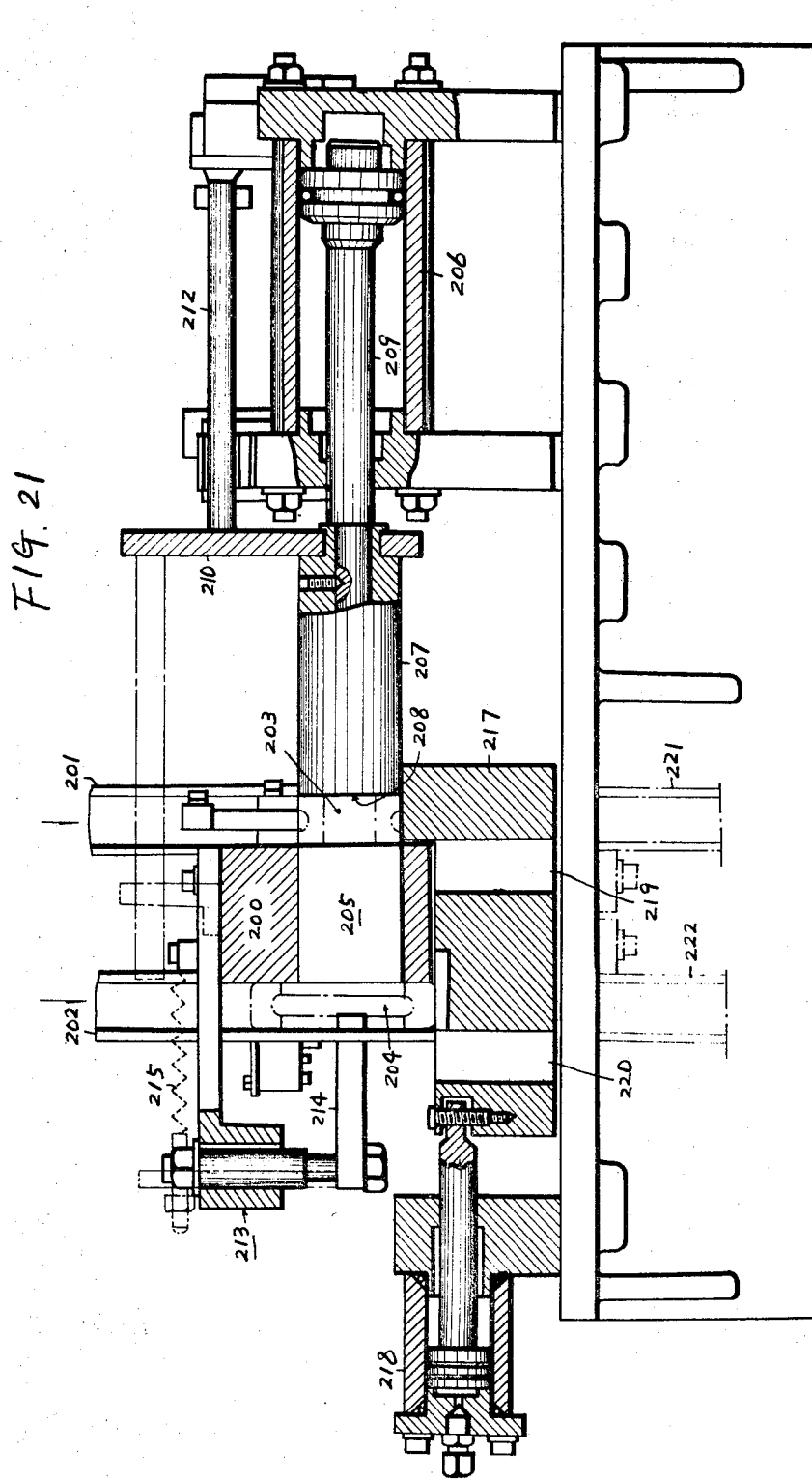
Figure 22:
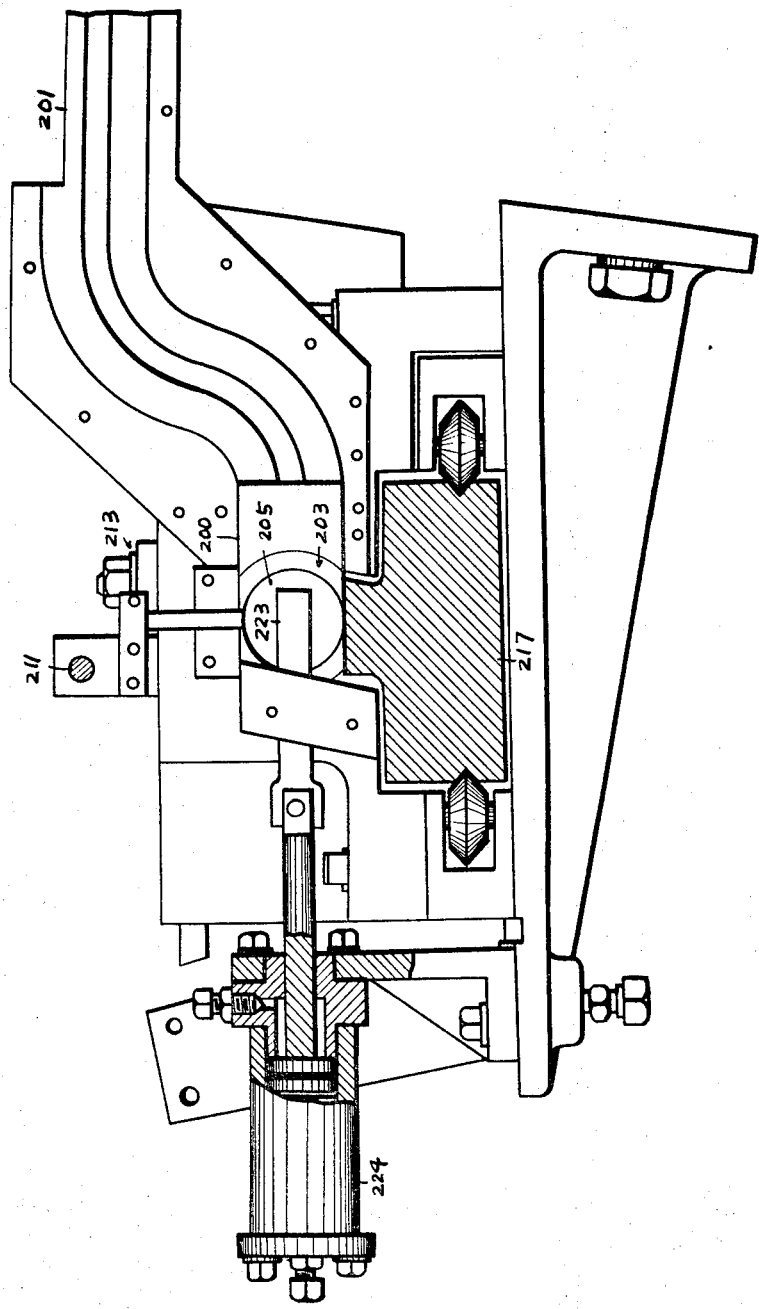

FIGS. 20 to 22 show another embodiment of the ring-pairing mechanism 8 which is used for inner and outer rings of larger diameter. Fixed body 200 is provided on both sides with an inner-ring-falling space 203 and an outer-ring-falling space 204 connected to chutes 201 and 202, said fixed body being also provided with an opening 205 for interconnecting said spaces 203 and 204.

The diameter of the opening 205 is such that the outer diameter of the inner ring can just pass through the opening. Positioned at the end surface of the inner-ring-falling space 203 is the front end surface 208 of a pusher 207 adapted to be moved back and forth by a cylinder 206. The pusher 207 is secured to a plate 210 secured to the piston rod 209 of the cylinder 206. The plate 210 is provided with a pusher bar 211 for releasing paired articles and a bar 212 for ascertaining the front end position and rear end position of the pusher. The numeral 213 denotes a lever disposed laterally of the outer-ring-falling space 204. When the pusher id retracted, the pawl 214 of the lever 213 extends into the outer-ring-falling space to hold the outer ring in the normal pairing position. The numeral 215 denotes a spring for pulling the lever 213 in a counterclockwise direction. When the pusher 207 is advanced to advance the inner ring to a position where it is paired with the outer ring in nested relation, i.e. with the inner ring disposed in the bore of the outer ring, the pusher bar 211 turns the lever 213 clockwise against the force of the spring 215 so that the pawl 214 is moved away from the outer-ring-falling space 204 and at the same time the other pawl 216 enters the outer-ring-falling space 204 so as to prevent the falling of the next outer ring. When the pusher is retracted the pusher bar 211 is also retracted, and along with this the lever 213 is turned counterclockwise thereby uncovering the outer-ring-falling space and inserting the pawl 213 into the space 204, thus being ready for the arrival of the next outer ring.

Numeral 217 denotes a shiftable body adapted to be moved back and forth below the fixed body in a direction crossing the fixed body. The shiftable body 217 is provided with discharge holes 219 and 220 for inner and outer rings not to be paired together, Normally the discharge holes are out of alignment with the spaces 203 and 204 in the fixed body 200. Thus, if a signal indicating that pairing should not be effected arrives, the shiftable body 217 is moved to the right as viewed in FIG. 20 to connect the discharge holes 219 and 220 to the spaces 203 and 204 so that the inner and outer rings are forwarded through their respective discharge chutes 221 and 222. A plate 223 closing the inlet of the opening 205 serves to prevent the inner ring from lying flat when it falls. Therefore, when the inner ring is pushed in by the pusher, it is necessary to uncover the opening 205 by a cylinder 224.

Figure 23:
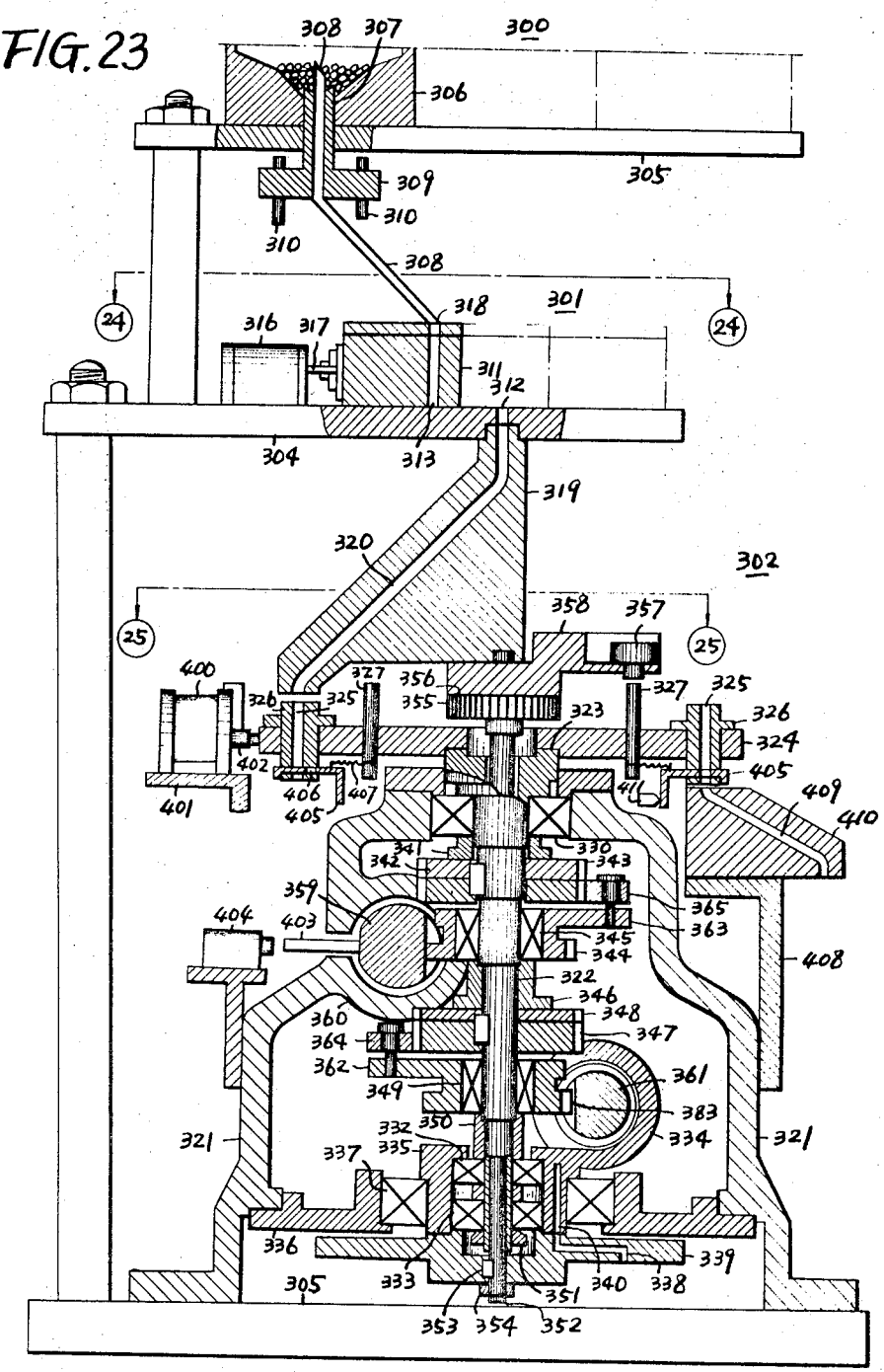

FIGS. 23 through 32 illustrate a structure 10 for storing balls for ball bearing of different dimension in the order directed and for supplying the balls into the space in an assembly of internal and external rings in the order directed. The structure 10 consists of a ball-storing portion 300, a ball-counting portion 301, and a ball-distributing-storing-supplying portion 302 as best shown in FIG. 23. On the first base 303 is mounted the supplying portion, on the second base 304 is mounted the counting portion 301, and on the third base 305 is mounted the storing portion 300.

The storing portion 300 has a plurality of storing members 306 for respective different size balls. The bottom of the storing member 306 is funnel-shaped and has a hole at the center thereof, in which a hollow ball pushup rod 307 with an inverse-cone-shaped top is slidably mounted. In the hollow rod 307, a ball guide-in tube 308 with obliquely cut top end is inserted. The pushup rod 307 is mounted to an up-and-down member 309, which is slidably mounted to a pair of guiding rods 310 and moved up and down by means of proper mechanism.

The counting portion 301 mounted on the second base 304 has the same number of counting members 311 as that of the storing member 306 as shown in FIG. 24. The counting members 311 are arranged radially around a ball exhaust port 312 perforated on the second base 304 so that each counting member corresponds to the storing member 306 for every different ball dimension.

The counting members 311 are slidably inserted into an elongated groove 315 of a holding member 314 and on each counting member 311 is provided a groove 313 for receiving a definite number of balls. The counting members 311 are connected with the top end of a piston rod 317 of the cylinder 316 of the same number as that of the counting member 311 and fixed to the second base 304.

The cylinders 316 are independently operated by the signal from the previous process, the ball dimension class-selecting signal at the measuring portion, and one of which selected by the signal is advanced up to the position where the groove 313 is brought into alignment with the exhaust port 312 provided at the center of the second base 304. After advanced, the cylinder piston is moved back up to the position where the groove 313 is brought into alignment with the ball-supplying port 318 connected with the ball guide-in pipe as shown in FIG. 23. On alignment of the groove 313 with the central port 312 of the second base 304, the balls in the groove 313 fall into the hole 320 provided in the ball-distributing plate 319 rotatably mounted to the lower base of the second base 304 at the central exhaust port 312. On further alignment of the groove 313 with the ball-supplying port 318, the balls in the ball guide-in pipe 308 are supplied into the groove 313 of the counting member 311.

Now referring to FIG. 23 explaining the construction of the ball-distributing-storing-supplying portion 302, the construction consists of a mechanism operated in an external cover frame 321 mounted on the first base 303 and a disc mechanism provided on the cover frame 321. The reference numeral 322 denotes a hollow shaft rotatably mounted in the cover frame 321, the top portion of which is projected out of the cover frame 321 and a flange 323 is mounted thereto to which a disc 324 is fixed.

On the disc 324, a plurality of storing cylinder member 326 provided with a hole 325 for receiving a definite number of balls are arranged on the peripheral portion thereof as shown in FIG. 25. Further, a plurality of confirming rods 327 corresponding to the storing cylinder members 326 are secured to the disc 324, and a cylinder 328 for determining the position of the distributing plate 319 is mounted to the upper face of the disc 324. The disc 324 is provided with a plurality of V-shaped cuts 329 on the periphery thereof so that the cuts 329 are positioned between the cylinder members 326.

The upper portion of the hollow shaft 322 is rotatably mounted to the cover frame 321 through a bearing 330 and the lower portion thereof is rotatably mounted to a casing 335 having a cylinder 334 integrally therewith through bearings 332, 333. The casing 335 is rotatably mounted to a circular plate 336 fixed to the cover frame 321 through a bearing 337 and has an air-pipe-fixing plate 339 integral therewith at the lower portion which is provided with an air outlet 338. The air outlet 338 is connected with another air outlet 340 provided in the casing 335.

In short, the hollow shaft is rotatably mounted to the upper portion of the external cover frame through a bearing 330, and to the lower portion of the cover frame through bearings 332, 333, casing 335, bearing 337 mounted to the casing 335, and a circular plate 336 secured to the cover frame.

Between the bearings 330 and 332 of the hollow shaft 322, a first intermediate washer 346, a second ratchet portion consisting of ratchet wheels 342, 343, a bearing 345 for rotatably holding a second pinion 344, a second intermediate washer 346, a first ratchet portion consisting of ratchet wheels 347, 348, a bearing 349 for holding a first pinion 383, and a third intermediate washer 350 are provided. The reference numeral 351 denotes a nut screwed to the lower portion of the hollow shaft.

The reference numeral 352 denotes a shaft extending through the hollow shaft and the top portion thereof is projected out of the central hole of the disc 324, and the lower end portion thereof is fixed to the air-pipe-fixing plate 339 with a key 353 and a nut 354. On the upper portion of the shaft 352 are fixed a position-determining plate 356 for determining the position of the distributing plate 319 and a fixing plate 358 for holding a noncontact switch 357 and a distributing plate. The position-determining plate 356 has the same number of V-shaped cuts 355 on the periphery thereof as that of the number of the storing cylinder members 326. The cylinder 328 shown in FIG. 25 is provided on the disc 324 so that it cooperates with the position-determining plate 356.

The reference numeral 359 denotes a rack to be in meshing engagement with the second pinion 344 and provided in the cylinder 360 secured to the cover frame 321. The reference numeral 361 denotes a rack to be in meshing engagement with the first pinion 383 and provided in the cylinder 334 which is integral with the casing 335. The reference numerals 362, 363 denote discs respectively integral with the first and second pinions. On the discs are provided hook members 364, 365 to be engaged with the ratchet wheels 347, 342 in the ratchet portions respectively.

Referring to FIGS. 26 through 28 which show the first ratchet portion, the ratchet wheels 347 and 348 are secured to the hollow shaft 322 with a key 366. On the disc 362 are provided a pin 367 for loosely supporting a hook member 364 and another 369 for holding an end of the spring 368 for urging the hook 364 toward the ratchet wheel 347. On the bracket 370 provided on the cylinder 334 are provided a pin 372 for loosely holding a hook 371 to be engages with the ratchet wheel 348 and another pin 374 for holding an end of the spring 373 for urging the hook 371 toward the ratchet wheel 348. The reference numeral 375 denotes a release pin for releasing the hook 371 from the ratchet wheel 348. The release pin 375 is provided on the disc 362 and positioned in the spacing 376 between the ratchet wheel 348 and the hook 371. The reference numeral 377 denotes a pin for engaging the other end of the spring 373 which is provided on the hook 371.

Since the first ratchet portion is constructed as described hereinabove, it is operated as follows: When air is sent into the back side 380 of the piston 379 shown in FIG. 28 and the rack 361 is moved upward to rotate the pinion 383 in the counterclockwise direction, the disc 362 is also rotated in the counterclockwise direction, and the hook 364 provided on the disc 362 is moved by one pitch rightward in FIG. 26 and engaged with the ratchet wheel. At the same time, the release pin 375 is also moved rightward in the FIG. and is brought into contact with the internal side edge of the hook 371 and moves the hook 371 outward to release the engagement with the ratchet wheel 348. When the other side 382 of the piston 381 is supplied with air, the pinion 383 is forced to rotate in the clockwise direction. However, the pinion 383 is not rotated in any direction, since it is secured to the hollow shaft 322 and the hollow shaft 322 is restrained by the second ratchet portion as described hereinafter. On the other hand, the casing 335 having the cylinder 334 integral therewith is rotatably mounted to the hollow shaft 322 as shown in FIG. 23, and the hook 371 provided on the cylinder 334 is out of engagement with the ratchet wheel 348 by the release pin 375. Therefore, the cylinder 334 is rotated in the counterclockwise direction about the hollow shaft 322, when the advances side 382 of the piston 381 is supplied with air as described above. On the rotation of the cylinder 334 in the counterclockwise direction, the release pin 375 is removed from the hook 371 to allow the hook 371 to move by one pitch and be brought into engagement with the next tooth of the ratchet wheel 348 and to stop the rotation of the cylinder 334. When the casing 335 having the cylinder 334 is rotated as described above, the shaft 352 fixed to the casing through the fixing plate 339 (shown in FIG. 23) is rotated and advaznces the distributing plate 319 fixed on the shaft 352 by one pitch in the counterclockwise direction.

The above description has been concerned with the construction and operation of the first ratchet portion.

Now the construction and operation of the second ratchet portion will be described with reference to FIGS. 29 through 31.

The ratchet wheels 342 and 343 are secured to the hollow shaft 322 by means of a key 384. On the disc 363 integral with the second pinion 344 are provided a pin 385 for loosely holding a hook 365 and another pin 387 for engaging an end of a spring 386 for urging the hook 365 toward the ratchet wheel 342. On the bracket 388 extending outward from the external cover frame 321 are provided a pin 390 for loosely holding a hook 387 to be engaged with the ratchet wheel 343 and another pin 392 for holding an end of a spring 391 for urging the hook 387 toward the ratchet wheel 343. The reference numeral 393 denotes a release pin for releasing the hook 387 form the ratchet wheel 343 and located in the spacing 394 between the ratchet wheel 343 and the hook 387. The reference numeral 395 denotes a pin for engaging the other end of the spring 391.

Since the second ratchet portion is constructed as described hereinabove, it is operated as follows. When air is brought into the back side 397 of the piston 396 and the rack 359 is moved downward to rotate the second pinion 344 in the counterclockwise direction in FIG. 31, the disc 363 is also rotated in the counterclockwise direction and the hook 365 provided on the disc 363 is moved by one pitch rightward in FIG. 29 and engaged with the ratchet wheel. At the same time, the release pin 393 is also moved rightward in the FIG. and is brought into contact with the internal side edge of the hook 387 and moves the hook 387 outward to release the engagement with the ratchet wheel 343. That is, the restraint of the hollow shaft 322 is released. When the other side 399 of the piston 398 is supplied with air in this situation, the pinion 344 is rotated in the clockwise direction and the ratchet wheel 342 is as well rotated in the clockwise direction by means of the hook 365 provided on the disc 363. On rotation of the disc 363, the release pin 393 is removed from the hook 387, and the hook 387 is engaged with the next tooth of the ratchet wheel 343 to restrict the rotation of the second ratchet portion. That is, by the movement of the second ratchet portion, the hollow shaft 322 is rotated in the clockwise direction by one pitch, and by the rotation of the hollow shaft 322 the disc 324 on the top end portion of the hollow shaft 322 is rotated in clockwise direction by one pitch. And at the same time, the first ratchet portion is rotated in the clockwise direction by one pitch and the shaft 352 fixed to the fixing plate 359 shown in FIG. 23 is also rotated in the clockwise direction by one pitch.

In short, by the movement of the first ratchet portion, only the shaft 352 is rotated in the counterclockwise direction in FIG. 25 and the relative position of the distribution plate 319 and the storing cylinder member 326 on the disc 324 is shifted by one pitch. By the movement of the second ratchet portion, the hollow shaft 322 and the shaft 352 are rotated at a time in the clockwise direction, and the distributing plate and storing cylinder member are advanced by one pitch without shifting the relative position.

Referring to FIGS. 23 and 25, the reference numeral 400 denotes a position determining cylinder for determining the position of the disc 324. The position-determining cylinder 400 is secured to the bracket 401 fixed to the outer portion of the external cover frame 321. The piston rod 402 of the cylinder 400 is positioned so as to be engaged with the V-shaped cut on the periphery of the disc 324. The cylinder 400 is operated by the position confirming rod 403 projected out of the rack 359 in the second ratchet portion, and the microswitch 404 fixed out of the external cover frame 321.

When the rack 359 is moved downward in FIG. 31, the microswitch 404 is operated at the end of the movement thereof to move back the piston rod 402, whereby the restraint of the disc 324 is released and the disc 324 is made possible to rotate in the clockwise direction by the opposite movement of the rack 359. The cylinder 400 makes the piston rod project immediately after the microswitch is opened and becomes ready to be engaged with the V-shaped cut on the periphery of the disc 324. When the piston rod is aligned with the V-shaped cut on the disc 324, the piston rod is advanced therein to determine the position of the disc 324 and fix it to the cover frame 321.

The reference numeral 405 denotes a closing plate disposed at the corresponding position to the storing cylinder member 326 on the back side of the disc 324 and provided with a ball-supplying outlet 406. A spring 407 is tensioned between a part of the closing plate 405 and the confirming rod 327 provided on the disc 324 so that the outlet 406 of the closing plate is normally out of alignment with the hole 325 of the storing cylinder member 326 as shown in FIG. 23.

The mechanism for supplying the balls in the storing cylinder member as shown in the right side of FIG. 23 and in FIG. 32 is as follows: A supplying plate 410 provided with a ball-supplying passage 409 is secured on the upper end of the bracket 408 fixed to a portion of the outside of the cover frame. The upper opening of the supplying passage 409 is positioned under the moving locus of the hole 325 of the storing cylinder member and the lower opening is aligned with the ball-falling position of a ball-assembling device (not shown) and is fixed thereto.

The reference numeral 411 denotes a lever provided behind the supplying plate 410 and on a portion of the cover frame. The end of the lever is positioned behind the supplying plate 410 and applied to the back end of the closing plate 405 in the supplying mechanism, and the other end of the lever 411 is connected with the piston rod 413 of the cylinder 412 secured to a portion of the cover frame. The pivot 414 of the lever 411 is fixed to a portion of the cover frame. 415 denotes a plate cam provided on a portion of the cover frame with the lever 411 and is operated for keeping the opening action of the closing plate at the supplying position for a definite period after the lever is moved back to supply thoroughly the residual balls.

In the above construction, since all the up-and-down members in FIG. 23 are normally moved up and down, at all the storing members 306 a definite number of balls are stored in the hole 313 of the counting member 311 through the corresponding guiding tube 308. In short, in all the counting members 311 are stored balls, different size in different members.

When a class-selecting signal made at the measuring portion for selecting the ball size is operated on one of the electromagnetic valve selected among the plurality of counting devices, the cylinder 316 in the corresponding counting member is actuated to supply the balls in the groove 313 of the counting member into the hole 325 of the storing cylinder member 326 aligned with the hole of the distributing plate through the hole 320 of the distributing plate 319. After the balls in the counting member are supplied, the electromagnetic valve is switched so that the counting member is moved back whereby the guiding tube is connected again with the groove of the counting member through the hole of the holding member to be supplemented with the balls in the groove in the counting member for the next supplying.

After the counting member is moved back and the electromagnetic valve for operating the cylinder 334 for driving the first ratchet portion is actuated, only the shaft 352 is rotated by one pitch in the counterclockwise direction in FIG. 25 by the reciprocation of the piston rod of the cylinder 334 and hole 320 of the distributing plate 319 provided on the shaft 352 is brought into alignment with the hole 325 of the adjacent storing cylinder member 326.

On rotation of the shaft 352, the position determining plate 356 is rotated, and the piston rod in the cylinder 328 for determining the position of engagement with the V-shaped cut 355 is retracted against the force of the builtin spring so as to be brought into engagement with the next V-shaped cut to determine the position of the distributing plate 319. By advancing of the distributing plate 319, the noncontact switch 357 provided on the fixing plate 358 (FIG. 23) is advanced and brought into alignment with the upper end of the next confirming rod 327 on the disc 324. Then, the position-confirming signal is transmitted to the previous process portion, measuring portion for preparing for the next measuring. Thus, the balls are temporarily stored in the groove of the storing cylinder portion fitted to the disc in accordance with the signal from the measuring portion.

The classified definite number of balls in the groove of the storing cylinder member are fallen on the ball-receiving portion when the bearing part is brought into the ball-receiving position as described below. When the bearing parts are positioned under the lower end port of the passage 409 of the supplying plate 410, the cylinder 412 sown in FIG. 32 is operated to rotate the lever 411 about the pivot 414 in the counterclockwise direction by the signal from the process portion afterwards (not shown), whereby the groove 325 of the storing cylinder 326 is brought into alignment with the hole 406 of the closing plate 405. Thus, the balls in the storing cylinder member are fallen through the passage 409 of the supplying plate 410. After the supplying of the balls out of the passage, the disc 324 and the distributing plate 319 are advanced by one pitch in the clockwise direction by the movement of the second ratchet portion. During this operation, the closing plate 405 makes the hole thereof be in alignment with the groove of the storing cylinder member until the disc is advanced by one pitch by the plate cam 415. Therefore, even when some balls are left in the storing cylinder member, the balls are completely supplied out. The closing plate is pulled inward by means of a spring 407 by the further rotation of the disc disengaging from the plate cam, and the hole 325 of the storing cylinder member is brought into alignment with the hole 406. Thus, the condition where the balls are received in the storing cylinder member is again realized.

In the case that the disc 324 is stopped and at the same time distributing plate 319 is rotated in the counterclockwise direction by the indication from the measuring portion for providing the balls into the storing cylinder member in sequence, it is preferred to provide a microswitch which transmits the signal for stopping the operation to the next process portion so that the empty disc without balls will not rotate in excess when the distributing plate is brought up to the L position after one rotation, and to the previous process portion so that the stored storing cylinder is not further provided with balls in excess when the distributing plate is brought up to L position after one rotation on the lower surface of the second base 304. This is for eliminating the error operation.

As described above, a common outlet 312 discharging the inverters of different dimensions and the vertical apertures 325 of a plurality of storage cylinders 326 provided on the peripheral surface of a disc at equal intervals are linked with the orifice 320 of the inverter-distributing board 319, and the inverter-distributing board is rotated intermittently according to the pitch of the storage cylinder, and the inverters of the group which has gone through a course of the selective counting are fed and distributed successively to the storage cylinder. Thus, the distribution of the inverters is assured of accuracy.

Moreover, a required number of inverters after selection and counting are pooled in a plurality of storage cylinders, independent with each other, which are taken out in order according to the indicating signals; thus, the possibilities of erroneous taking-out of the inverters, or the useless procedure of taking out all of the inverters consequent upon the inverters being blocked, may entirely be eliminated.

Furthermore, when any required storage cylinder is to be brought onto the fixed discharge board 410, the inverter distributing board and the disc may together be made to rotate intermittently, while, when any one of the inverters is to be distributed and supplied to an empty storage cylinder, the disc is, at first, set at rest, and then, the inverter distributing board alone is made to rotate in a reverse direction, and, consequently, the relative positions of the storage cylinder and the inverter distributing board may be maintained intact, rendering an easy handling thereof.

The driving signal for the inverter distributing board is supplied from the prior process of this device to feed the inverters to the storage cylinder while the distributing board may be moved optionally irrespective of the rotation or stop of the disc and, at the same time, the discharge of the storage inverters, and the rotation of the disc are driven by signals obtained from the afterprocess, separately from the supply of the inverters.

Accordingly, the operations of the prior process and afterprocess may be completely differentiated by this device, each being independently performed. Thus, the prior process and afterprocess may be performed successively and independently even though there is a difference in their respective cycle times.

Moreover, even in case the product is rejected on account of a defect produced in the prior process, the afterprocess may be performed if only its cycle were curtailed.

Also, the inverters of different classes may be stored according to their respective classes, and, accordingly, no article of a different class may be allowed to mingle in a class of the inverters, even if there is an error in discharge. No inverter left undischarged will thus be permitted to remain in the succeeding position of discharge of the inverter discharging devices.

Again, since the supply of the inverters of a different class may be discharged by a signal in the measuring part, such discharge may be carried out according to the order set.

Furthermore, the supply of the inverters to the counting part 301 from the storing part 300 is always carried out in accordance with each different class, and, consequently, even if the same signal arrives successively to the same class of inverters, there will be no likelihood that the inverters be found short in number.

Besides, because the whole passage for the inverters is closely sealed, there will be no possibility whatsoever that the inverters be stuck with dust or an inverter of a different class happens to be mingled in.

Also, various processes of counting, supplying, temporary storage and discharge of the inverters are incorporated in a single device, with the distances curtailed, so that, a curtailment of the cycle may be brought about, with the consequence that the required floor space may be curtailed.

Each moving part of the device of this invention may operate upon receiving either a singly signal or a combined signal from a plurality of the can switches I, II, III, ..., XII, XIII which are driven by the motor 441 (FIG. 1) incorporated in the bottom part of the frame 440, on which the measuring instruments for inner and outer rings are mounted, and/or the signals from the confirmation switches installed on respective moving parts.

The settings of the cam switches are so made on the motor shaft that they operate at the specified times and for the required lengths of time in effecting respective movements.

Referring to FIGS. 1 and 2, when the switches 444 and 445 for confirming the inner and outer rings installed on the chutes 1, 2 which are communicated to the sections 442, 443 for pushing in the inner ring and outer ring determine that the inner and outer rings retained by the stays provided in the chutes are consecutively lined up at least to the positions of the said confirming switches 444, 445 and beyond, and when respective confirming signals are overlapped, the cam switch driving motor is set to run, and respective cams mounted on the shaft 446 are rotated, thereby starting the operation of the device of this invention. By the action of the cam switch I, the electromagnetic valves for air switching of the cylinders (not shown in the drawings) for pushing out the inner and outer rings (hereinafter referred to as the products) are actuated to push out the inner and outer rings. The inner and outer rings thus pushed out trundle along respective chutes 1,2, and arrive at the positions for measuring the inner and outer rings.

For the stabilization of the products after a definite period of time, the electromagnetic valves which get the measuring operations started by the action of the cam switch II are actuated.

At the position for measuring the inner ring 3, the electromagnetic valve of the cylinder 32 shown in FIG. 5 is operated by the said cam switch II. Then, the air over the piston 43 is discharged, and the lever 15 is pushed up by the spring 35, whereby the movable measuring terminal 18 descends, bringing about a measuring condition.

At the position for measuring the outer ring 4, the valve for air switching of the cylinder 52 shown in FIG. 9 is actuated by the aforementioned cam switch II, and then, the microswitch 94 (FIG. 8) is pushed by the forwarding of the confirmation arm 100 fit on the stationary plate 60 integrally built with the piston rod 59 to set the vibrator 91 in motion, which may tap on the outer rim of the outer ring for a definite length of time, thereby ensuring the close fitting of the balls 78, 81 at the terminals 71, 80 to the racing of the outer ring. The measuring condition is brought about when this vibrator 91 comes to cease its motion after a lapse of the definite length of time.

The measurement taken at each measuring position is taken out as a signal at the detectors 23, 79, and the signal processed by the operation unit 5 is memorized as the indication signal for the discrimination of balls to match the dimension of the sets of inner and outer rings being measured.

Simultaneous with the measurements with both of these detectors 23, 79, the racing diameters are measured by means of the dial gauges 28, 87. The measurements of these dial gauges 28, 87 are used in the following manner:

At respective detectors 23, 79, the measurements of actual dimensions of the inner and outer rings are taken, and this measurement signal is sent to an operation unit 5. At this operation unit, the operation of (Actual I.D. of the racing of the outer ring)—
(Actual O.D. of the racing of the inner ring)

is carried out, and by using the difference between the diameters of both racings as the indication signal, the balls which may match this difference of the dimensions are selected from among the balls classified beforehand.

On the other hand, at the dial gauges 28, 87, every time, the inner ring and the outer ring are checked against the standard dimensional ranges to see whether the measured values fall respectively in the plus range, within the standard ranges, or in the minus range.

That the result of the operation carried out by these two detectors in NG (Negative) means that the difference of dimension between the diameters of both racings is either larger or smaller than the range of this dimension set for the balls selected, and accordingly, that the balls matching this difference of dimension are not ready for use. These outer and inner rings which have been measured with the results of NG, however, may be combined to have a set with the difference of the dimensions matching the balls classified beforehand by altering their combinations. It is to make the operation of recombining these inner and outer rings easy, to that the dial gauges may be utilized. Thus, when the result of the operation carried out by the two detectors 23, 79 gives the NG signal, this NG signal is cancelled, and as directed by the signals from respective dial gauges, the corresponding trap(s), of the three traps installed somewhere along the chutes running to the assembling section, is (are) released, thereby sorting the inner and outer rings respectively into (+), 0, (−) receptacles in accordance with the signals of the dial gauges. With the inner and outer rings are sorted out in this way by means of dial gauges, the sets of rings with the difference of dimensions matching either one of the balls classified beforehand are produced by charging the inner and outer rings that are held in the (+) receptacles as a pair in the machine of this invention. In the same way, the desired sets are obtained by taking (−) rings, inner and outer, and 0 rings, respectively. In the system where the dial gauges are jointly used in this way at the measuring section, if for some malfunction, two rings, either inner or outer, or both are brought to the following assembling section, or the product is not supplied to either one of the feeding sections, for these inner and outer rings are discharged without being assembled.

Accordingly, in the system where the dial gauges are not jointly used, the NG signals given out as the result of the operation carried out by the two detectors is not cancelled off, but is used in operating the carrier to discharge the inner and outer rings without assembling them.

By the action of the cam switch VII, the electromagnetic valve of the cylinder for the measurement of the outer ring, and that for the inner ring are shut off. Then, at the outer-ring-measuring section, the piston rod 59 goes back, and the terminals 71, 80 come off the outer ring and go back. At the inner-ring-measuring section, the piston 34 descends, thereby pushing up the lever 15. Then, the movable measuring terminal moves up, being parted from the inner ring.

At this time, by the action of the cam switch III, the electromagnetic valve for the air switching of the cylinder 90 operates in such a way as to let the stop rod 92 go back at the outer-ring-measuring section, and the piston 98 recedes, while pushing the spring. Then, the stop rod 92 comes off the chute 84. Consequently, the inner and outer rings trundle along the chutes, and come to rest at the position over the carrier 140 of the inner- and outer-ring-assembling mechanism shown in FIG. 15. At the inner-ring-measuring section 3, the electromagnetic valve for operating the rod for stopping the inner ring is actuated. In this instance, as in the case of the outer ring, the stop rod comes off the chute, and the product trundles along the chute, coming to stop at a position over the carrier. The products which arrive at the carriers are detected by the noncontact switches 188, 189 installed on the chutes 130, 131. While the cam switch XIII is getting the signal of "-Products Exist" from the noncontact switches, the motor of the cam switch keeps on running, thereby continuing the operation. As the valve for the air switching of the first piston rod 170 which moves the carrier by the action of cam switch XII to get the said first piston rod 170 forwarded, the outer ring and the inner ring fall down respectively in the cavities 145, 152 of the carriers. The position to which the carrier is forwarded is determined by use of the confirming microswitch 191 and T metal 150. As the cam switch XII is shut off, the aforementioned electromagnetic valve is switched on. Then, the first piston rod 170 and carrier 140 go back, and the outer ring and inner ring come to lie on the shaft line of the pusher.

The backed position of the carrier 140 is determined by means of the microswitch 192 and T metal 150.

As the microswitch 191 is pushed, and then the condition of the microswitch being pushed is met, the electromagnetic valve of the cylinder 183 for operating the pusher is actuated. Then, the pusher is forwarded to push the inner ring through the hole 46 of the carrier, thereby pushing the said inner ring into the bore of the outer ring. The inner and outer rings are put together in that way.

At this time, the tip of the rod 187 tightly bound onto the pusher presses the microswitch 193.

Figure 19:
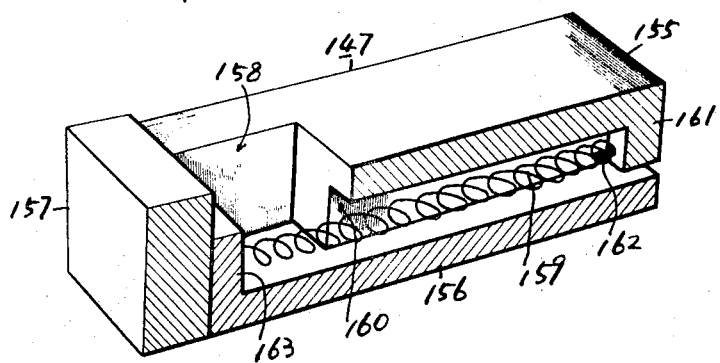

At the time when this assembling is completed, the pin 186 integrally built with the pusher pushes the stepped part 161 of the stand 147 (FIG. 19). Then, the cavity 145, the chute 137 for discharging the assembly and the hole of the stand 147 are brought into alignment, and the assembly falls down along the discharge chute 137 (FIG. 6). As the assembly falls down and trundles along the discharge chute, the noncontact switch installed on the discharge chute issues the signal of "Products Passed."

When a condition that this signal and the signal of "Assembling of the outer and inner rings finished" are issued is met, the valve for air switching of the cylinder 316 for forwarding the computer 311 (FIG. 23) which is selected by reference to the selection signal of "Required Balls" memorized at the time of measurement, is actuated to get the computer 311 forwarded, and then, the specified numbers of balls selected fall down through the hole 320 of the distributing board 319 in the vertical hole 325 of the storage cylinder 326 on the disc 324 (FIG. 25).

After a definitely set period of time, that is, after a passage of the time set with the time for the ball to fall from the counter 311 down to the vertical hole 325 of the storage cylinder 326 and for the ball to rest stable there in calculation, by the action of the cam switch IV, the balls with different sizes are stored in the sequence specified, and the electromagnetic valve for air switching which operates the rack 359 of the device for discharging the balls into the specified gap of the assembly of the inner and outer rings is actuated. Then, as the cam switch IV is made off, the electromagnetic valve is restored, and the distribution board 319 moves anticlockwise by one pitch.

The determination that the distribution board 319 moved by one pitch is made by means of the confirming rod 327 held on the disc 324 and the noncontact switch 357 installed on the distribution board 324.

If this determination is omitted, the machine is stopped to operate by making the motor of the cam switch out of operation.

Following the procedure mentioned above, a series of the operation cycle running from the charge and discharge of the first products through their assembling and to storing the selected balls is finished, and the preparation for the second measurement and the measuring operation is set in.

Since the pusher 181 of the assembler 8 goes back and keeps on pushing the microswitch 194, after the determination is made with the noncontact switch 357 installed on the distribution board 319, the motor of the cam switch is kept running, and the second operation cycle is commenced.

In the system described above, the measuring section both for the inner and outer rings is set up on a single frame. If the measuring sections are set up on separate frames provided for the inner and outer rings, respective cam switches and motors may, by necessity, be installed individually.

When a tentative storing area is provided in the midway between the assembling section and the memorizer 10, an electrical memorizer may preferably and additionally be provided to keep communication with the storing section.

The assemblies of the inner and outer rings measured and combined in the manner described above are stored on the part of the discharge chute 137 coming out of the assembler.

As the specified assemblies held in this storing chute are taken out automatically or manually, and are sent to the succeeding assembling station below the discharge board 410 (FIG. 23) of the device 10 where the balls with different diameters, being stored in the sequence specified, are discharged into the specified gap of the assemblies of the inner and outer rings. Then, as the required gap is opened in the assemblies, the balls held in the vertical hole 325 of the storage cylinder 326 are fed into the aforementioned gap.

Referring to FIGS. 33 and 34, the gap 422 is formed by the pull of the outer rim of the inner ring toward one side of the bore of the outer ring 420, and the spacer is so inserted that the gap is brought in alignment with the bottom of the vertical slot 409 of the discharge board 410. This position is set by the use of two pins 424, 425.

As the outer rim of the outer ring comes in touch with these two pins, pushing the terminal 427 of the microswitch installed centrally in between these two pins, the electromagnetic valve for air switching of the cylinder shown in FIG. 32 is actuated by the signal from the microswitch 426 to send the tip projection of the lever 411 forwardly. Then, referring to FIG. 25, the balls held in vertical slot 325 of the storage cylinder on the disc 324 located somewhere between K and L fall down into the gap through the hole 406 of the baffle 405, and then through the vertical slot 409, entering in the upper part of the spacer.

As the sets of the inner and outer rings with balls put in are taken out, the terminal 427 of the microswitch 426 returns, and the electromagnetic valve of the cylinder 412 is shut off. Then, the lever goes back, parting from the end surface of the baffle 405.

Upon receiving the signal from the microswitch 426, after a definitely set time from this instant, or after the passage of time in which the balls may get out through the baffle 405 and have fallen down into the gap between the inner and outer rings, the electromagnet valve for operating the cylinder 400 of the piston rod 402 which stays the disc 324 in position is actuated to send the piston rod 402 going back, thereby releasing its tight binding to the disc. Namely, the disc is set free.

At this time, the electromagnetic valve for air switching of the cylinder 360, with which it is to turn the disc is actuated, thereby moving the rack 359. Then, the confirming rod 403 is brought to the position facing the noncontact switch 404, and the switch 404 issues the confirmation signal informing that the rack 359 is moved.

Upon receiving this signal, the electromagnetic valve of the cylinder 360 is shut off. Then, the rack returns, and the disc turns clockwise by one pitch. At this time, the succeeding storage cylinder is brought on the discharge board 410.

As the electromagnetic valve of the cylinder 400 for fixing the disc is shut off after that short length of time taken by the confirmation signal of the noncontact switch 404, or after the lapse of time required for the disc to move one pitch, the piston rod 402 goes forward. The tip of the piston rod 402 enters into the V-groove of the disc 324, thereby staying the disc in position in readiness for the operation of putting the balls in after one ball is finished, awaiting the arrival of the succeeding signal from the microswitch 426.

In case the dial gauges are not used at the measuring section, for the sets of the inner and outer rings that were proven unacceptable as measured at the measuring section, ±NG (Negative) signal is produced by the operation device, and this is memorized. Then, as the inner and outer rings arrive at a position on the upper surface of the carrier of the assembler, the arrival of the products are confirmed with the noncontact switches 188, 189 (FIG. 15).

With the cam switch XIII receiving the signal of "Products exist" from the noncontact switches 188, 189, the operation is continued. Upon receiving the signal from the cam switch XII and the ±NG signal, the electromagnetic valve of the cylinder 141 is actuated. Then, the air is sent into the space between the second piston rods 174, 175 (FIG. 16) and the end plate 178 of the second piston 177. The second piston rods 174, 175 and the second piston 177 move toward the end plate 179. The carrier goes back, and the discharge grooves 142, 144 provided on the carrier are brought in alignment with the tip of the chutes 13, 131. The products held on the upper surface of the carrier then fall down respectively into the discharge grooves 142, 144, trundling along the discharge chutes 138, 139 to be expelled.

In the next place, if, while the measurements give either ±NG or OK, either one or both of the inner and outer rings delay in arriving or do not arrive at all at the assembling section, then the operation of the device may continue in the following fashion.

If the products do not arrive at a point on the upper surface of the carrier within a definite set length of time after the measurement of the products was taken, the confirmation signal of "Products Exist" of the noncontact switches 188, 189 (FIG. 15) cannot be produced when the signal of the cam switch is issued. Then, the emergency signal is put out of the cam switch XIII, and simultaneously with the stopping of the machine, the electromagnetic valve of the cylinder 141 (FIG. 15) for expelling ±NG is actuated, in such a way that the products held on the carrier is discharged in the same manner as in the discharging operation of the unacceptable inner and outer rings.

If the products lie in the chutes 130, 131, they are pushed out by hand. If either one or both of the inner and outer rings, two in number, should exist, either one or both of the noncontact switches 188, 189 detect(s) and confirm(s) this fact of "Two Products Exist." Since the confirmation of the "Two Products" signifies the staging of the products beyond the set length of time, that is, the interval between the actuations of the cam switches XIII and the cam switch XII, an emergency signal is put out to stop the operation of the machine, and the products are expelled in the same manner as in discharging the unacceptable inner and outer rings.

We claim:

1. A method of automatically assembling antifriction bearings characterized by measuring the mutually cooperative groove diameters of a pair of inner and outer rings to be assembled together separately by means of independent measuring mechanisms thereby to express them in terms of different electric signals, computing said different electric signals in a single arithmetic unit provided separately from and independent of said measuring mechanisms thereby to derive a single electric signal corresponding to the difference between the groove diameters of the inner and outer rings, said electric signal being used, to select rolling elements of desired size from a source of such rolling elements classified in advance according to size, the selected rolling elements being instantly allowed to stay in a temporary storing region, said measured inner and outer rings being allowed to stay respectively in separate temporary storing regions and the corresponding inner and outer rings in this temporary storing region being then paired together, the measured inner and outer rings being instantly paired together and then allowed to stay in a temporary storing region, or the measured inner and outer rings being allowed to stay respectively in separate temporary storing regions and then the corresponding inner and outer rings in said separate temporary storing region being paired together and then allowed to stay in a temporary storing region, and feeding the corresponding rolling elements staying in the temporary storing region into the eccentric clearance between the paired inner and outer rings when the latter are brought to a regular position, whereby complete articles are assembled.

2. An apparatus for automatically assembling antifriction bearings comprising a measuring mechanism (3) for measuring the groove diameter of an inner ring and deriving an electric signal corresponding to the groove diameter of the inner ring, a measuring mechanism (4) for measuring the groove diameter of an outer ring and deriving an electric signal corresponding to the groove diameter of the outer ring, an arithmetic unit (5) fed with said electric signals from said measuring mechanisms as inputs thereof for deriving an electric signal corresponding to the difference between said input electric signals, said derived electric signal being used as a selection indication signal for rolling elements, a mechanism (8) for pairing a set of measured inner and outer rings to be assembled together, which mechanism is capable of discharging those inner and outer rings which are found to be unsuitable for being paired together as a result of the measurement and computation, and means (10) for counting out a required number of rolling elements of required size by means of the selection indication signal from the arithmetic unit, storing them in a temporary storing region and feeding rolling elements into a clearance formed between a set of inner and outer rings to be coupled together as the latter are moved to a predetermined position, wherein temporary storing regions respectively for inner and outer rings are provided between the inner-ring groove diameter-measuring mechanism (3) and inner- and outer-ring-pairing mechanism (8) and between the outer-ring groove diameter-measuring mechanism (4) and inner and outer-ring-pairing mechanism (8) and/or a temporary storing region for paired rings is provided between the inner- and outer-ring-pairing mechanism (8) and means (10).

3. An apparatus for automatically assembling antifriction bearings as described in claim 2, wherein the inner-ring groove diameter-measuring mechanism comprises a detector and a fixed measuring member disposed above and below a main body, a lever disposed in a central opening in the main body so as to be swingable in a bearing, a movable measuring member corresponding to the fixed measuring member disposed on the front end of said lever, the front end of said detector being resiliently urged locally against the upper surface of the lever, a cylinder and a spring acting on the upper and lower sides at the rear end of said lever, it being so arranged that at a predetermined time the lever is swung to hold an article to be measured around the outer surface thereof between holder elements provided at the front ends of said two measuring members.

4. An apparatus for automatically assembling antifriction bearings as described in claim 2, wherein the outer-ring groove diameter-measuring mechanism comprises a shiftable plate disposed on the main body of a cylinder, said shiftable plate carrying an attaching plate for a fixed measuring member, a support for a lever having at its front end a movable measuring member corresponding to the fixed measuring member and adapted to be swingable in a bearing, and a gate-shaped member having a detector mounted thereon, the piston rod of the cylinder being connected to the shiftable plate through a spring, said piston rod having a cam follower substantially secured thereto, the rear end of the lever being shaped in the form of a cam surface resiliently urged against said cam follower by means of a spring, it being so arranged that the movement of the piston rod advances the shiftable plate to bring the two measuring members into an article to be measured, i.e. into the bore of a ring, whereupon the movement of the shiftable plate is forcibly stopped, and thereafter the piston rod alone is moved and the cam follower is moved by the cam surface of the lever, thereby cancelling the swing control on the lever, and thereafter the action of the spring causes the lever to swing to spread the two measuring members in the bore of the ring, this movement of the lever being detected by the detector locally contacted with the upper surface of the lever.

5. An apparatus for automatically assembling antifriction bearings as described in claim 2, wherein the detector is provided with clamping means therefor which is constructed in such a manner that a detector attaching part is bored with a holding hole for fitting the cylindrical portion of the detector therein, an attaching hole is provided above said holding hole for fitting a stepped bushing therein a space is formed between the lower surface of the stepped bushing and the holding hole, in which space is mounted a ring smaller in diameter than the space and having a bore slightly larger in diameter than the cylindrical portion, and a screw is inserted from the end portion of the detector attaching body toward the center of the holding hole, the front end of said screw bearing against said ring.

6. An apparatus for automatically assembling antifriction bearings as described in claim 2, wherein the inner- and outer-ring-pairing mechanism is constructed in such a manner that a carrier having on one surface an inner-ring-discharging inclined groove and an inner-ring-supplying groove, on the opposite surface an outer-ring-discharging inclined groove corresponding to said inner-ring-discharging groove and an outer-ring-supplying and paired article passage groove corresponding to said inner-ring-supplying groove, and also having in the upper region of the thickness of the carrier an inner-ring pushing-in opening parallel to a line at right angles with the paired article passage groove and inner-ring-supplying groove, and further having below said opening a receiver block for supporting or releasing outer rings or paired articles within the paired article passage groove, is connected with a two-action three-position stop cylinder by means of which the inner- and outer-ring-supplying grooves, respectively, at both ends of the inner-ring pushing-in opening are brought below inner- and outer-ring-supplying chutes, respectively, or the inner-ring pushing-in opening is brought to a position aligned with a pusher on the lateral side, and at the end of the inner-ring pushing-in operation by the pusher, the receiver block is actuated in association with the operation of the pusher to release the paired article.

7. An apparatus for automatically assembling antifriction bearings as described in claim 2, wherein the inner- and outer-ring-pairing mechanism is constructed in such a manner that provided below a fixed body having one surface an inner-ring-supplying groove and on the opposite surface an outer-ring-supplying groove corresponding to said inner-ring-supplying groove and also having in the thickness thereof an inner-ring pushing-in opening communicating with said inner- and outer-ring-supplying grooves is a shiftable body which is slidable in a direction crossing said fixed body, said shiftable body being provided with inner- and outer-ring-dishcarging grooves with the same pitch as the inner- and outer-ring-supplying grooves in the fixed body, said shiftable body being normally aligned with the inner- and outer-ring-supplying grooves, there is provided a pusher on the same axis as the inner-ring pushing-in opening and having its front end disposed facing toward the inner-ring-supplying groove, said pusher being adapted to be advanced and retracted in the inner-ring pushing-in opening at a predetermined time, and there is provided a stopper in the inner- and outer-ring-pairing part adapted to release the paired article in association with the operation of said pusher at the end of the inner-ring pushing-in operation by the pusher.

8. An automatic bearing-assembling device as defined in claim 2 having different size of ball scoring mechanisms wherein a plurality of storing cylinder members having a hole for receiving a definite number of balls are arranged on the peripheral of an intermittently rotating disc at equal intervals, to said storing cylinder members balls of selected and counted class being supplied in the measured order, whereby several classes of balls of different size are independently pooled.

9. An automatic bearing-assembling device as defined in claim 2 having different size of ball storing mechanisms wherein a common exhausting outlet for exhausting different size of balls is connected with a disc having a plurality of storing cylinder members through a ball-distributing plate, the upper end of said ball-distributing plate being rotatably fitted to the lower portion of said common exhausting outlet, the lower exhausting outlet of said ball-distributing plate being positioned on the pitch circle of the plurality of storing cylinder members arranged on the disc at equal intervals, whereby the ball-distributing plate is intermittently rotated with respect to the disc by the same pitch as that of the arrangement of the storing cylinder members at the time of selecting and counting balls so as to supply one set of balls in each storing cylinder member.

10. An automatic bearing-assembling device as defined in claim 2 having different size of ball-storing and exhausting mechanisms wherein the upper end of a ball distributing plate is rotatably fitted to the lower portion of a common exhausting outlet for exhausting different size of balls so as to connect said common exhausting outlet with a hole of said ball-distributing plate, the lower exhausting outlet of said ball-distributing plate being positioned on the pitch circle of the plurality of storing cylinder members arranged on the disc at equal intervals, the upper end of the ball passage in the fixed exhausting plate being positioned at the portion on the lower face of said disc being in alignment with said pitch circle of said storing cylinder members, whereby when said disc is intermittently rotated for bringing a desired storing cylinder onto said fixed exhausting plate, said ball-distributing plate is also intermittently rotated in the same direction with said disc, and when a set of balls selected and counted are supplied into an empty storing cylinder member, only said ball-distributing plate is intermittently rotated in the opposite direction without rotating said disc.

11. An apparatus for automatically assembling antifriction bearings as described in claim 2, characterized in that dial gauges are provided respectively disposed by the side of the detectors of the inner-ring-measuring part and outer-ring-measuring part for detecting whether the groove diameters of inner and outer rings are greater or smaller than or within the ranges of preset sizes, and as a result of the actual measurement and computation of the groove diameters of the inner and outer rings, only in case articles should not be paired such inner and outer rings are discharged and at the same time classified on the basis of the results of the measurement with the respective dial gauges and in accordance with the classification indicated by the dial gauges.